(12) United States Patent
Ozcetin et al.

(10) Patent No.: US 6,611,922 B2
(45) Date of Patent: *Aug. 26, 2003

(54) POWER SYSTEM TIME SYNCHRONIZATION DEVICE AND METHOD FOR SEQUENCE OF EVENT RECORDING

(75) Inventors: H. Kurtulus Ozcetin, North Saanichton (CA); Simon H. Lightbody, Victoria (CA); Peter M. Van Doorn, North Saanich (CA); Rene T. Jonker, Victoria (CA)

(73) Assignee: Power Measurement, Ltd., Saanichton (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/370,863

(22) Filed: Aug. 9, 1999

(65) Prior Publication Data

US 2003/0014678 A1 Jan. 16, 2003

(51) Int. Cl.[7] .............................. G06F 1/04; G06F 1/12
(52) U.S. Cl. ...................................... 713/400; 713/503
(58) Field of Search .......................... 713/400, 503, 713/600, 401

(56) References Cited

U.S. PATENT DOCUMENTS

| | | | |
|---|---|---|---|
| 4,077,061 A | | 2/1978 | Johnston et al. |
| 4,156,280 A | | 5/1979 | Griess |
| 4,240,149 A | | 12/1980 | Fletcher et al. |
| 4,264,960 A | * | 4/1981 | Gurr |
| 4,345,311 A | | 8/1982 | Fielden |
| 4,365,302 A | | 12/1982 | Elms |
| 4,388,611 A | | 6/1983 | Haferd |
| 4,400,783 A | * | 8/1983 | Locke, Jr. et al. ............ 702/58 |
| 4,455,612 A | | 6/1984 | Girgis et al. |
| 4,459,546 A | | 7/1984 | Arrington et al. |
| 4,463,311 A | | 7/1984 | Kobayashi |
| RE31,774 E | | 12/1984 | Fletcher et al. |
| 4,568,934 A | | 2/1986 | Allgood |
| 4,612,617 A | | 9/1986 | Laplace, Jr. et al. |
| 4,642,564 A | | 2/1987 | Hurley |
| 4,663,587 A | | 5/1987 | Mackenzie |
| 4,672,555 A | | 6/1987 | Hart et al. |
| 4,715,000 A | | 12/1987 | Premerlani |
| 4,783,748 A | | 11/1988 | Swarztrauber et al. |
| 4,794,369 A | | 12/1988 | Haferd |

(List continued on next page.)

OTHER PUBLICATIONS

"Quad4® Plus and MAXsys™ Multifunction Electronic Meters and IEDS," On–Line User Guide, *QUAD4 Plus/ MAXsys Products User's Guide*, Rev 1.01, pp. 1–1–1–4; 1–13–1–15; 4–100, 4–107–4–108.

"QUAD4® Plus and MAXsys™ Multifunctin Electronic Meters and IEDS", On–LIne User Guide Product Definitions, *QUAD4 Plus/MAXsys Products User's Guide*, Rev. 1.01, pp. DEF–1–DEF–13.

"Protective Relaying Theory and Applications," edited by Walter A. Elmore, pp. 17–37 (1994).

"The world is changing. The old answers no longer apply," *Schlumberger*, Bulletin.

(List continued on next page.)

*Primary Examiner*—Dennis M. Butler
(74) *Attorney, Agent, or Firm*—Brinks Hofer Gilson & Lione

(57) ABSTRACT

A time synchronization device and method is provided for synchronizing an internal clock of the power monitor. The internal clock may be adjusted to a periodically stable frequency according to a calculated counting error. Also, a time of the internal clock may be synchronized to a universal time, the time of the internal clock advancing at a determined rate. The determined rate may be adjusted if the internal time differs from the universal time plus a processing time.

93 Claims, 17 Drawing Sheets

U.S. PATENT DOCUMENTS

| | | | |
|---|---|---|---|
| 4,837,504 A | | 6/1989 | Baer et al. |
| 4,839,819 A | | 6/1989 | Begin et al. |
| 4,878,142 A | | 10/1989 | Bergman et al. |
| 4,878,185 A | | 10/1989 | Brand et al. |
| 4,884,021 A | | 11/1989 | Hammond et al. |
| 4,886,981 A | * | 12/1989 | Lentini et al. |
| 4,901,221 A | | 2/1990 | Kodosky et al. |
| 4,914,568 A | | 4/1990 | Kodosky et al. |
| 4,979,122 A | | 12/1990 | Davis et al. |
| 5,017,860 A | | 5/1991 | Germer et al. |
| 5,059,896 A | | 10/1991 | Germer et al. |
| 5,061,890 A | | 10/1991 | Langini |
| 5,081,413 A | | 1/1992 | Yamada et al. |
| 5,122,735 A | | 6/1992 | Porter et al. |
| 5,132,610 A | | 7/1992 | Ying-chang |
| 5,151,866 A | | 9/1992 | Glaser et al. |
| 5,155,836 A | | 10/1992 | Jordan et al. |
| 5,212,441 A | | 5/1993 | McEachern et al. |
| 5,224,011 A | | 6/1993 | Yalla et al. |
| 5,224,054 A | | 6/1993 | Wallis |
| 5,233,538 A | | 8/1993 | Wallis |
| 5,243,536 A | | 9/1993 | Bradford |
| 5,243,537 A | | 9/1993 | Neumann |
| 5,245,275 A | | 9/1993 | Germer et al. |
| 5,247,454 A | | 9/1993 | Farrington et al. |
| 5,258,704 A | | 11/1993 | Germer et al. |
| 5,262,715 A | | 11/1993 | King et al. |
| 5,270,640 A | | 12/1993 | Kohler et al. |
| 5,301,121 A | | 4/1994 | Garverich et al. |
| 5,391,983 A | | 2/1995 | Lusigman et al. |
| 5,414,812 A | | 5/1995 | Filip et al. |
| 5,426,780 A | | 6/1995 | Gerull et al. |
| 5,481,700 A | | 1/1996 | Thuraisingham |
| 5,498,956 A | | 3/1996 | Kinney et al. |
| 5,530,846 A | * | 6/1996 | Strong ........................ 713/400 |
| 5,537,029 A | | 7/1996 | Hemminger et al. |
| 5,548,527 A | | 8/1996 | Hemminger et al. |
| 5,549,089 A | | 8/1996 | Snell et al. |
| 5,555,508 A | | 9/1996 | Munday et al. |
| 5,600,526 A | * | 2/1997 | Russell et al. |
| 5,627,759 A | | 5/1997 | Bearden et al. |
| 5,631,843 A | | 5/1997 | Munday et al. |
| 5,650,936 A | | 7/1997 | Loucks et al. |
| 5,715,438 A | * | 2/1998 | Silha .......................... 713/400 |
| 5,736,847 A | | 4/1998 | Van Doorn et al. |
| 5,828,576 A | | 10/1998 | Loucks et al. |
| 5,862,391 A | * | 1/1999 | Salas et al. ............ 395/750.01 |
| 5,958,060 A | * | 9/1999 | Premerlani .................. 713/400 |
| 5,973,481 A | * | 10/1999 | Thompson et al. ............ 322/7 |
| 5,995,911 A | * | 11/1999 | Hart |
| 6,236,949 B1 | * | 5/2001 | Hart |
| 6,304,517 B1 | * | 10/2001 | Ledfelt et al. ................ 368/10 |

OTHER PUBLICATIONS

"Series PM170 Powermeters," *SATEC*, Bulletin.
"System 270 Powermeter," *SATEC*, Bulletin.
"RPM090 Digital Transducer," *SATEC*, Bulletin.
"Series 290 Power Monitoring System," *SATEC*, Bulletin.
"PM290HD Powermeter With Harmonic Analysis," *SATEC*, Bulletin.
"AX–7 Analog Expander," *SATEC*, Bulletin.
"Application Software, Professional Systems For Energy Control and Management," *SATEC*, Bulletin.
"Power Monitoring And Analysis Systems," *SATEC*, Bulletin.
"PM—295 Powermeter / Harmonic Analyzer," *SATEC*, Bulletin.
"PM 295 Power Monitoring System with Harmonic Analysis," *SATEC*, Bulletin.
"PM 170M Powermeter—with KVA Measurements," *SATEC*, Bulletin.
"Vector Electricity Meter with the Site Genie™ Monitor," *General Electric*.
"Vectron® SVX Solid–State Polyphase Meters," *Schlumberger*, Bulletin 11314 (Mar. 1996).
"MAXsys® 2510 Substation/High–End Direct Access Meter," *Siemens*, Bulletin.
"Maxsys® 2410 Direct Access Meter," *Siemens*, Bulletin.
"AIN ALPHA® Meter For IEC Standards," *ABB Information Systems*, Bulletin.
"ALPHA Stars™, National Wireless Communications for Remote Metering," *ABB Information Systems*, Bulletin.
"AIN ALPHA, High Function Multi–Tariff Solid State Electricity Meter," *ABB Network Partner*, PB 42–280–lb, pp. 1–20.
"MARK–V Digital True RMS Energy Meter," *TransData, Inc.*, Bulletin.
"MAXsys® —PSI," *Siemens*, Bulletin.
"MeterView™ Software Environment ..., ... Instant Access to Maxsys™ Meter Information," *Siemens*, D00024D (1997).
"Maxsys® —Multi–Access Metering And Control," *Siemens*, Bulletin.
"MAXsys® For Energy Providers," *Siemens*, Bulletin.
Quad4® Plus MAXsys® Meters and IEDs, *Siemens, QUAD2DSQ (1998)*.
The QUAD4® Plus Solid–State Meter, *PSI*, Bulletin.
"kV Telephone Modem," *General Electric*, Bulletin.
"kV A–Base Meters," *General Electric*, Bulletin.
"kV Class 320 Meters," *General Electric*, Bulletin.
"EnergyAxis™ Customer Site Metering System For On–SIte Metering and Power Analysis,", *ABB Information Systems*, Bulletin (1998).
"8500 ION® Direct Access Billing MEter," *8500 ION™*, Power Measurement, Bulletin (Aug. 11, 1998).
"7700 ION® 3–Phase Power Meter, Analyzer and Controller," *7700 ION™*, Power Measurement, Bulletin, (Apr. 22, 1998).
"American National Standard for Electric Meters—COde for Electricity Metering," *American National Standard*, Document ANSI C12.1 (1995).
"American National Standard for Electromechanical Watthour Meters," *The Institute of Electrical and Electronics Engineers, Inc.*, ANSI C12 (1987) (Revision of ANSI C12–10–1987).
"American National Standard for Electronic TIme–of–Use Registers for Electricity Meters," *The Instutute of Electrical and Electronics Engineers, Inc.*, ANSI C12 (Revision of ANSI C12 13–1985) (1991).
"American National Standard for Solid–State Electricity Meters," *The Institute of Electrical and Electronics Engineers, Inc.*, ANSI C12.16 (1991).
"American National Standard for Electricity Meters 0.2 and 0.5 Accuracy Classes," *American National Standards*, ANSI C12.20 (1998).
"ISO—Specification MTR1–96, Engineering Specification For Polyphase Solid–State Electricity Meters For Use On The ISO Grid," Exhibit A, pp. 1–42 (1997).
"Specifications For Approval Of Type of Electricity Meters, Instrument Transformers And Auxiliary Devices," *Consumer and Corporate Affairs Canada*.

International Standard, Alternating current static watt–hour meters for active energy (classes 0,2 S and 0,5 S), *International Electrotechnical Commission*, Second edition (1992).

"Meter–Mounting Devices, Industrial Products," *Canadian Standards Association*, C22.2 No. 115–M (1989).

"Alternating–Current Electricity Metering, Electric Power Systems and Equipment," *Canadian Standards Association*, CAN3–C17–M (1984).

International Standard, Amendment 1 to Publication 868 (1986), *International Electrotechnical Commission*, Modification 1 (1986).

"International Standard, Electromagnetic Compatibility (EMC)—Part 4: Testing and measurement techniques—Section 15: Flickermeter—Functional and design specifications," *International Electrotechnical Commission*, 61000 4–15 (1997).

"Measurement Guide for Voltage Characteristics—Electricity Product Characteristics and Electromagnetic Compatibility," 230.02 *Norcomp, Unipede* (1995).

"Voltage characteristics of electricity supplied by public distribution systems," *BSI Standards*, 50160 (1995).

"Minutes of the 7th Meeting, Distribution Committee," *EEI*, 1998.

* cited by examiner

Fig. 3A

Time Sync Message Senty by GPS Receiver

On Time Mark (OTM)
↓

| ASCII Time String: | <SOH>DDD:HH:MM:SSQ<CR><LF> |
|---|---|
| where: <SOH> | Start of header (ASCII 01hex) |
| DDD | Day of the year |
| HH | Hours |
| MM | Minutes |
| SS | Seconds |
| Q | Quality flag |
| | <SP> (ASCII 20hex) = GPS receiver locked |
| | '?' (ASCII 3Fhex) = GPS receiver unlocked |
| <CR> | Carriage return (ASCII 0Dhex) |
| <LF> | Line feed (ASCII 0Ahex) |

Time Sync Message Senty by Master Computer

On Time Mark (OTM)
↓

| ION Timesync Msg: | Len, MsgID, Desc, Src, Dest, Serv, MsgType, secs, usecs, CRC |
|---|---|
| where: Len, MsgID, | Length of Message |
| MsgID | Message ID |
| Desc | Description |
| Scr | Scr address |
| Dest | Dest Address |
| Serv | Service type = 1 |
| MsgType | Message type = 0x11 for timesync |
| Secs | Time seconds |
| Usecs | Time uSeconds |
| CRC | Checksum |

Fig. 3B

POWER SYSTEM TIME SYNCHRONIZATION DEVICE AND METHOD FOR SEQUENCE OF EVENT RECORDING

CROSS REFERENCE TO RELATED APPLICATIONS

The following co-pending and commonly assigned U.S. patent applications have been filed on the same date as the present application. All of these applications relate to and further describe other aspects of the embodiments disclosed in the present application and are all herein incorporated by reference.

U.S. patent application Ser. No. 09/370,317, "REVENUE METER WITH POWER QUALITY FEATURES", filed Aug. 9, 1999.

U.S. patent application Ser. No. 09/371,883, "A-BASE REVENUE METER WITH POWER QUALITY FEATURES", filed Aug. 9, 1999.

U.S. patent application Ser. No. 09/370,695, "REVENUE METER WITH GRAPHIC USER INTERFACE", filed Aug. 9, 1999.

U.S. patent application Ser. No. 09/370,686, "REVENUE METER BLADE ASSEMBLY AND METHOD OF ATTACHMENT", filed Aug. 9, 1999.

U.S. patent application Ser. No. 09/369,870, "METHOD AND APPARATUS FOR AUTOMATICALLY CONTROLLED GAIN SWITCHING OF POWER MONITORS", filed Aug. 9, 1999.

U.S. patent application Ser. No. 09/370,696, "EXTERNAL COMMUNICATIONS INTERFACE FOR A REVENUE METER", filed Aug. 9, 1999.

U.S. patent application Ser. No. 09/370,757, "A KEYPAD FOR A REVENUE METER", filed Aug. 9, 1999.

REFERENCE TO MICROFICHE APPENDIX

A microfiche appendix, Appendix A, is included of a computer program listing. The total number of microfiche is 6. The total number of frames is 186. A second microfiche appendix, Appendix B, is also included of schematic diagrams. The total number of microfiche is 1 and the total number of frames is 23.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

1. Field of the Invention

This present invention generally relates to power systems. More specifically, the present invention relates the time synchronization to a universal time of monitors on the power system.

2. Background of the Invention

In a typical electrical distribution system, an electrical supplier or utility company generates and distributes electrical energy to consumers via a power distribution network. The power distribution network is the network of electrical distribution wires which link the electrical supplier to its consumers. Typically, electricity from the utility is fed from a primary substation over a distribution cable to several local substations. At the local substations, the supply is transformed by distribution transformers from a relatively high voltage on the distributor cable to a lower voltage which is supplied to the end consumer. From the substations, the power is provided to users over a distributed power network that supplies power to various loads. Such loads may include, for example, various power machines used by the end consumer.

As such, each load and generator in the system is tied together directly through wiring, or indirectly through transformers. When there is a change in load, a change in generating capacity or a problem in the system, the effects propagate from the source of the event to other parts of the system. For instance, a fuse blowing in a motor load may cause a voltage surge in the system which causes other loads to draw excess current and blow fuses down the line. Likewise, a generator may fall off line causing a voltage sag which causes other equipment to malfunction.

Since the electrical power system is complex and effects can propagate through the system quickly, e.g., in fractions of a second, it is often difficult to determine which device is the source of a fault and which are the victims. A fault includes, for example, a short circuit, a sudden large increase in load, the sudden loss of generating capacity, and a lightning strike to a transmission line. Such faults are detected, for example with a waveform recorder, included as part of a power monitor or revenue meter with power monitoring capabilities. The waveform recorder plots a waveform which represents an amplitude of voltage and current versus time. When the fault occurs, it causes the waveform of the electrical signal to deviate from its normal near sine wave. In addition, the root mean square (rms) voltage and current of the waveform can change.

Since the waveform is plotted against time, many power monitors include an internal clock that can indicate when the fault occurred. Information of when the fault occurred is used to determine the source of the fault by identifying the power monitor that first recorded the fault. Since it takes time for the fault to propagate through the electrical distribution system, the source fault is located closest to the power monitor that first detected the fault. Thus, to determine the source of the fault, the consumer identifies which power monitor recorded the fault first.

A problem exists in that the internal clock time of each power monitor often varies among monitors. For example, known internal clocks utilize a 32.768 kHz watch crystal and a periodic interrupt timer (PIT) to determine time. The PIT increments, or decrements, depending on the application, a clock register which holds a value representing the time of the internal clock. Accuracy of this PIT is determined by the accuracy of the 32.768 kHz watch crystal. Due to the crystal's impurities, age and an operating temperature, the crystal's accuracy is typically 10–50 parts per million (ppm), which equals 26.8 seconds–2.2 minutes variance per month. Thus, the internal clock lacks the accuracy required to timestamp events such as faults that propagate through the power system in mere fractions of seconds.

One way to avoid the time variance between power monitors is for a master clock to broadcast a time synchronization message to each power monitor in the communications loop. Upon receipt of the time synchronization message, each power monitor then sets its internal clock to match that of the time broadcast message. Thus, the internal clocks can be synchronized each time the broadcast message is received. Problems occur in that the clock will be discontinuous at each second boundary since the PIT that is driving the internal clock is asynchronous to the master clock. Also, the internal clock drifts from the master clock until the next time broadcast is received.

Another way to avoid time variance between power monitors is to synchronize the power monitors to an inputted line frequency. According to Independent System Operator (ISO) specifications, internal clocks of the power monitors must adjust to synchronize with ISO Grid Operation line frequency. Many utilities are required to control the line frequency so that a number of line frequency cycles in a one week time period are within 0.02% of the exact number of cycles expected for that time period based on the specified line frequency. For example, when the integrated time error exceeds +/−2 seconds, a signal is sent to all utilities connected to Western Systems Coordinated Council (WSCC) and the utilities bias the automatic control systems to correct the error. Since the line frequency fluctuates and is unpredictable, a problem exists in that the total error of the internal clock becomes the error of the crystal plus the error of the line frequency when the line frequency is measured in terms of internal clock ticks.

Accordingly, there is a need for a time synchronization device and method which provides for an accurate sequence of fault recording. As such, there is a need for a device and method that periodically synchronizes internal clock times of monitors to a universal time or line frequency. In addition, there is a need to synchronize internal clock times without causing discontinuities and drift.

SUMMARY OF THE INVENTION

Such needs are met or exceeded by the present method and time synchronization device for synchronizing internal clock times to a universal time. Such synchronization, as performed by the present invention, provides for an accurate sequence of fault recording. The present device and method speeds up or slows down the rate at which the internal clock time proceeds to avoid discontinuities and drift associated with merely changing the internal time to equal the universal time.

More specifically, a preferred embodiment of the present invention receives a time synchronization message from an entity at a first free running counter count. The time synchronization message contains the universal time when the time synchronization message was sent. Thereafter, the time synchronization message is processed at a second free running counter count to determine the universal time. The time of the internal clock is compared to the universal time plus a processing time which is determined by the difference between the second free running counter count and the first free running counter count. Finally, the predetermined rate of advance of the internal clock is adjusted based on the difference between the internal time and the universal time plus the processing time to receive the message containing the universal time.

In another embodiment, the internal clock of the power monitor is synchronized to a periodically stable frequency. Cycles of the periodically stable frequency are counted after each elapse of a predetermined time period. The elapse of the predetermined time period defines a present window and a previous window. A counting error and a change in counting error are calculated, wherein the change in counting error is the difference of a counting error calculated for the present window and a counting error calculated for the previous window. The present method detects when a change in counting error is within a predetermined range. When the counting error is within the predetermined range, the internal clock of the power monitor is adjusted to the line frequency according to the counting error calculated for the present window.

Thus, when time synchronizing is achieved through the line frequency monitoring, the internal clock time ticks, i.e., internal clock seconds are accurately determined by the rate at which the line frequency deviates from a nominal setting. Instead of setting and tracking a master clock, the line frequency synchronizing mechanism senses how unit ticks drift with respect to universal time ticks and adjust the unit ticks accordingly.

BRIEF DESCRIPTION OF THE DRAWINGS

Other features and advantages of the invention will be apparent to those skilled in the art with reference to the detailed description and the drawings, of which:

FIGS. 3A and 3B are exemplary time synchronization messages sent by a GPS receiver and a master computer, respectively, according to the time synchronization device and method of the present invention;

TABLE OF ACRONYMS

Figure 1:
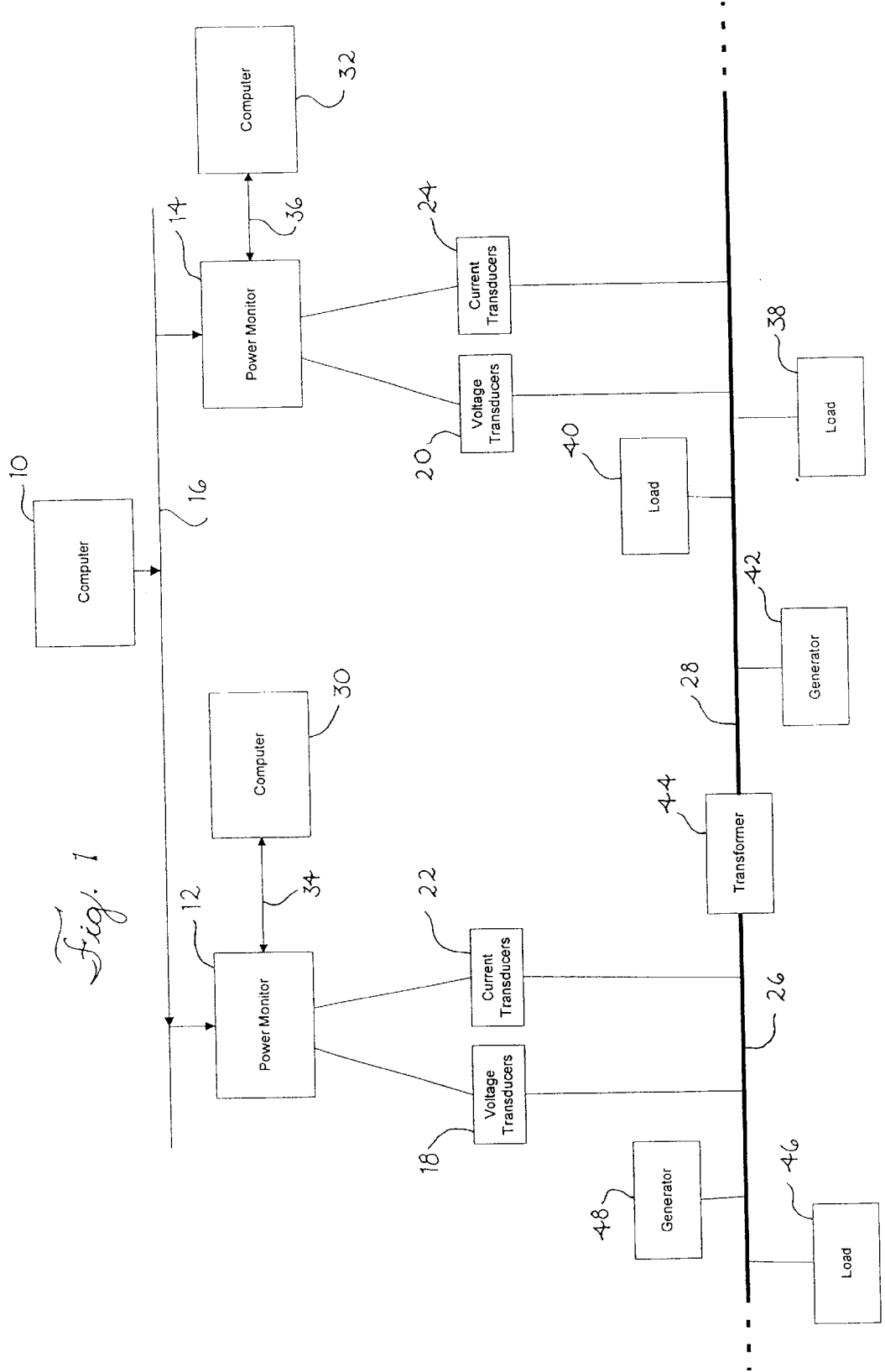
FIG. 1 is a block diagram of an electrical distribution system with power monitors containing internal clocks that synchronize to a master clock located in a computer, according to the time synchronization device and method of the present invention.

The following table aids the reader in determining the meaning of the several acronyms used to describe the present invention:

AC=Alternating Current.
DEC=Decrement Register.
GPS=Global Positioning System.
Hz=Hertz.
ISO=Independent System Operator.
M=Mega ($\times 10^6$).
us=microsecond ($\times 10^{-6}$).
ns=nanosecond ($\times 10^{-9}$).
OTM=On Time Mark.
PIT=Periodic Interrupt Timer.
PLL=Phase Locked Loop.

ppm=Parts Per Million.
rms=Root Mean Square.
RTC=Real Time Clock.
TB=Time Base.
UTC=Universal Time Coordinated.

DETAILED DESCRIPTION OF THE INVENTION

To help locate the source of a fault located on an electrical distribution system, a time synchronization device and method of the present invention adjusts an internal clock time, for each power monitor connected on the system, to equal a master clock time. An exemplary power monitoring device is one described in U.S. Pat. No. 5,736,847, where the internal clock is derived from a 32.768 kHz watch crystal, for example.

There are various ways to derive the internal clock from the 32.768 kHz watch crystal. One way is to multiply up the 32.768 kHz crystal frequency to a 16.777216 MHz bus frequency utilizing known phase locked loop (PLL) circuitry such as the circuit in an MC68332 microcontroller manufactured by Motorola, located in Schaumburg, Ill. Internal time of the power monitor is kept with a periodic interrupt timer (PIT) which generates an interrupt to advance the internal time by incrementing a value stored in a clock register, for example. For example, the PIT generates 1024 interrupts per second to advance time by 976.5625 uS each interrupt. The frequency of the PIT is generated by dividing down the 16.777216 MHz bus frequency.

According to known techniques, the internal time of the power monitoring device is represented as the number of seconds since Jan. 1, 1970. In a preferred embodiment of the present invention, the number is 64 bits long and is stored in the clock register. The upper 32 bits represent the seconds and the lower 32 bits represent the fractional part of the seconds. The 32 bits that represent the fractional part of the seconds must roll over at the end of one second, therefore, one count of the 64 bit representation of the internal time is $\frac{1}{2}^{32}$=0.2328 nano seconds (nS). For 1024 PIT interrupts per second, each PIT interrupt adds 4194304 counts to the 64 bit representation of the internal time, which equals 976.5625 uS assuming the crystal is exactly 32.768 kHz. Since 4194304 is a relatively large number, and one count represents 0.2328 nS, the time advance with each PIT interrupt can be adjusted with a great deal of precision.

Another way to derive an internal clock from the 32.768 kHz watch crystal is to utilize a microprocessor, for example Model number MPC821 manufactured by Motorola, located in Schaumburg, Ill., which multiplies up the watch crystal frequency to a 49.9712 MHz bus frequency. Thereafter, the microprocessor divides down the 49.9712 MHz frequency to 3.1232 MHz to create a time base (TB) facility used for the internal clock. Thus, after 3.1232 million cycles or TB ticks, one second of the internal clock has elapsed. To achieve milliseconds, the 3.1232 MHz frequency is divided by 1000 using known circuitry. This frequency is stored in a decrement register (DEC) which is part of the MPC821 architecture, and decreased every clock tick. Thereafter, every 3.13.2 cycles, a decrement interrupt is triggered to indicate that one millisecond has elapsed on the internal timer. Artisans will appreciate that, since the decrement register only accepts whole integers, to achieve one second, 3123 cycles are decreased for 800 ms and 3124 cycles are decreased for 200 ms, for example. The TB and DEC interrupts together outline the clock architecture for MPC821. While TB ticks provide a free running counter for time interval calculations, the DEC interrupt alone determines the unit ticks for the internal clock.

Figure 2:
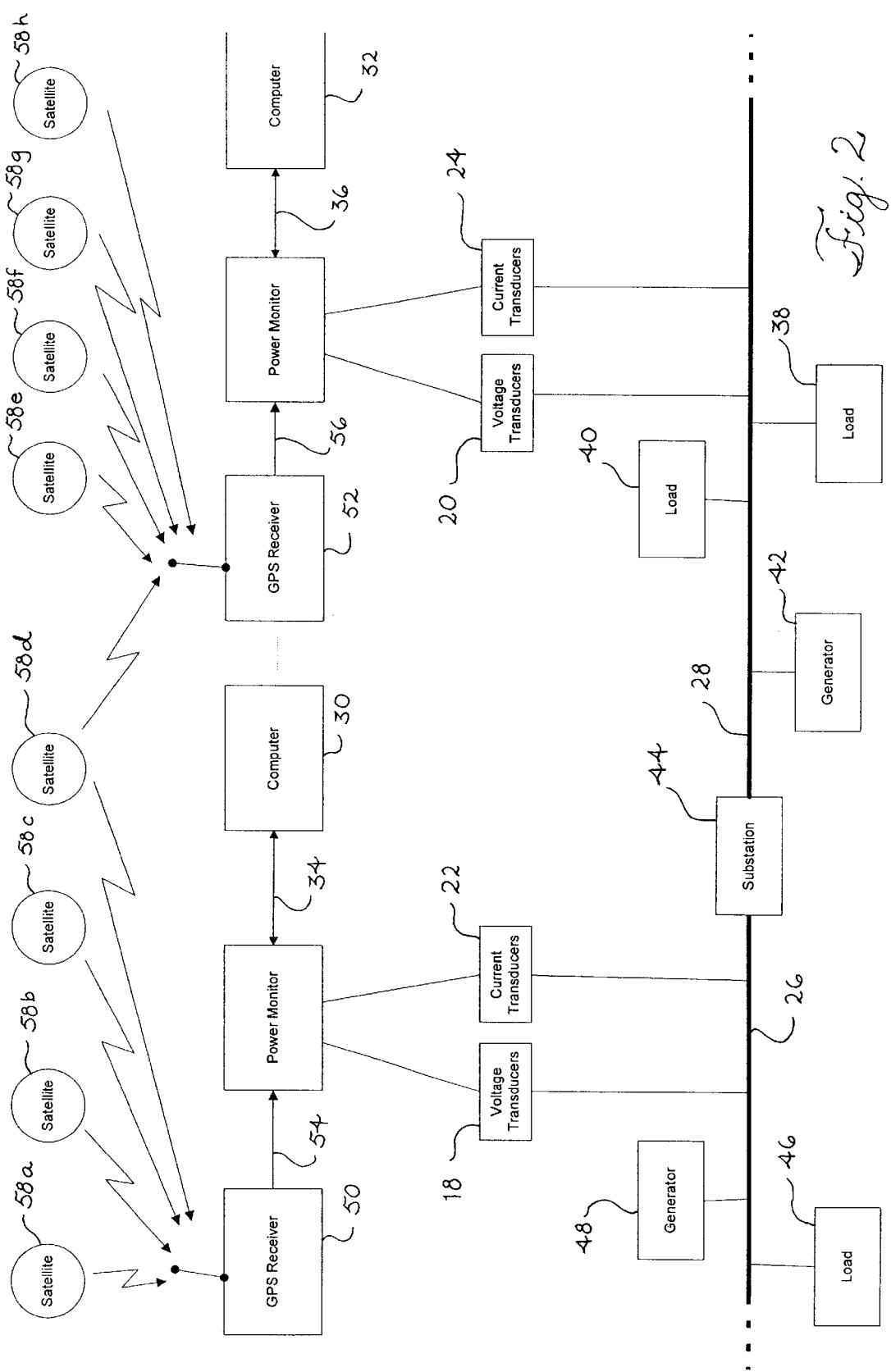
FIG. 2 is a block diagram of an electrical distribution system with power monitors containing internal clocks that synchronize to a global positioning system (GPS), according to the time synchronization device and method of the present invention.

Referring now to the drawings, and particularly FIGS. 1 and 2, to supply universal time to the internal clocks of the power monitors, the present time synchronization device and method utilizes various entities. A master computer 10, for example, shown in FIG. 1, contains a master clock (not shown) to synchronize the power monitors' internal clocks to the master clock's universal time. Another source of universal time is a global positioning system (GPS), shown in FIG. 2. Yet another source, line frequency, is used to adjust the power monitors' internal clocks in synchronization with the universal time.

Referring to FIG. 1, the time master computer 10 contains the master clock for all power monitors on the system. The master computer 10 connects to power monitors 12, 14 via communications bus 16, for example. The communications bus is ideally based on the RS-485 standard. Preferably, the master computer 10 sends out a time synchronization message on bus 16 at regular intervals, e.g., about once every minute. While artisans will appreciate that the present invention functions over a wide range of frequencies, a required accuracy of the internal clock of the monitor depends on frequency that the master computer sends out the time synchronization message.

The power monitors 12, 14 receive signals from voltage transducers 18, 20 and current transducers 22, 24 which are scaled versions of the voltages and currents in power system wiring 26, 28. The power monitors record the rms values and waveforms of these voltages and currents in a manner described, for example, in a commonly assigned co-pending patent application to Rene T. Jonker, et al. entitled "Revenue Meter with Power Quality Features," Ser. No. 09/370,317, filed on Aug, 9, 1999, incorporated by reference herein. To identify when a reading and the waveform occurred, the power monitor attaches a timestamp to each reading and waveform that is captured.

Thereafter, the readings, waveforms and timestamps are requested by processing computers 30, 32 through communication links 34, 36. These communication links 34, 36 are ideally Ethernet links, but may also be RS-232, RS-485 or any other suitable communications technology. It can be appreciated that information also may be retrieved by master computer 10.

When a fault occurs at a first load 38, for example, power monitor 14 will record the event almost immediately. Thereafter, the effects of the fault will propagate through the wiring 28, past second load 40 and first generator 42, through transformer 44 to wiring 26, and then be recorded by power monitor 12. The time period that elapses between power monitor 14 recording the fault and power monitor 12 recording the fault, in addition to other monitors in the system (not shown), is used to determine where the fault originated and which device in the system experienced the fault. For example, the speed at which electricity travels through the conductors is known, and the distance from each monitor to where the fault occurred can be determined. Thus, it can be determined that the first load 38 is the source of the fault, and not a third load 46 located near a second generator 48.

The clock on each power monitor 12, 14 is synchronized to the universal time, as described below, so that timestamps are accurately compared between power monitoring devices. It can be appreciated that if all the power monitoring devices occupy the same communications link, then the absolute accuracy of the master clock is not as important since all power monitors are synchronized to the same master clock. In this case the master clock is provided by the master computer's clock.

Referring to FIG. 2, if, however, all the power monitoring devices are not on the same communications link, GPS receivers 50, 52 are connected to the power monitors 12, 14 via lines 54, 56 respectively, to provide universal time. An exemplary GPS receiver is the XL-DC 600 manufactured by True Time in Santa Rose, Calif. When power monitors 12, 14 are not on the same communications link, the GPS receivers provide time synchronization information to the power monitors, which is accurate up to one millionth of a second. The master clock is the time kept by GPS satellites 58a–58h.

It can be appreciated that each power monitoring device 12, 14 requires the time synchronization information to be broadcast on the communications loop 16, 54, and 56 at regular intervals, for example, once every second. Artisans will appreciate that other time intervals can be used. The accuracy of the internal clocks depend on the frequency that the time message is sent out. Thus, if the time synchronization information is sent only every day or every hour, for example, the power monitors' internal clocks are not as accurate as when the information is sent out every second. When the internal clocks are not accurately set to the master clock, the ability to find faults on the system can be adversely affected.

Referring to FIGS. 3A and 3B, exemplary time synchronization messages are shown for a GPS receiver and a master computer, respectively. Each master clock source sends out a time broadcast message containing the universal time and an "on time mark" (OTM). The OTM is defined as a certain point or byte in the time synchronization message that the universal time occurred. As shown in FIG. 3A, a first bit of the carriage return is the OTM as defined by the GPS. A quality flag represents whether the receiver's antenna is locked onto the satellite or not. If the antenna is locked to at least one satellite, the GPS receiver time is guaranteed to be accurate within 100 us of Universal Time Coordinated (UTC). If the antenna is blocked from the satellite cluster, however, the time on the receiver runs freely according to the GPS receiver's internal clock. As shown in FIG. 3B, the OTM for the master clock's time synchronization message is defined as the first bit of the first byte to indicate the length of the message.

Figure 4:
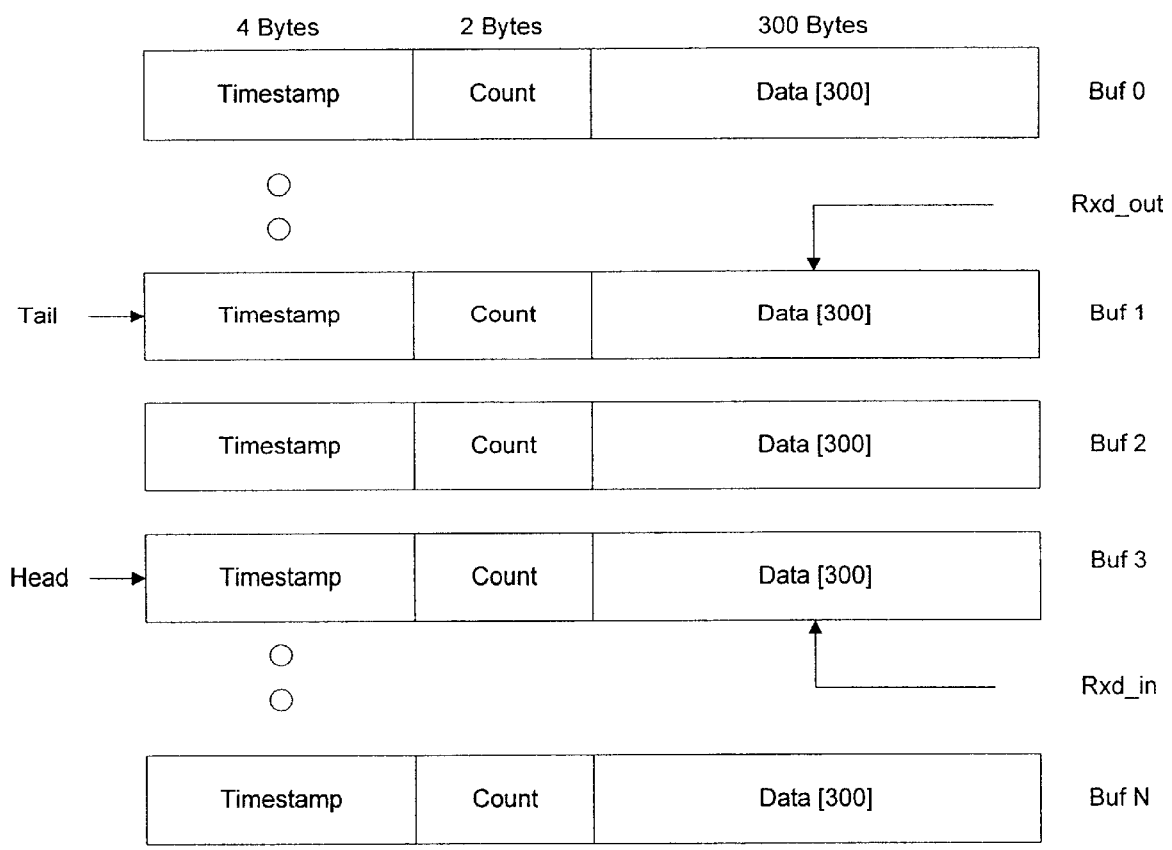
FIG. 4 is an exemplary buffer structure for storing time synchronization information according to the time synchronization device and method of the present invention.

Referring to FIG. 4, an exemplary circular buffer structure is shown, including Data, Timestamp and a Count information. The time synchronization message is stored in the Data buffer which is, for example, 300 bytes long. The total number of buffers is implementation dependent and depends on factors such as processor speed and cost. It can be appreciated that a sufficient number of buffers is necessary to allow the processor to gather and process packets stored in the circular buffers before data is overwritten by new packets.

Figure 5A:
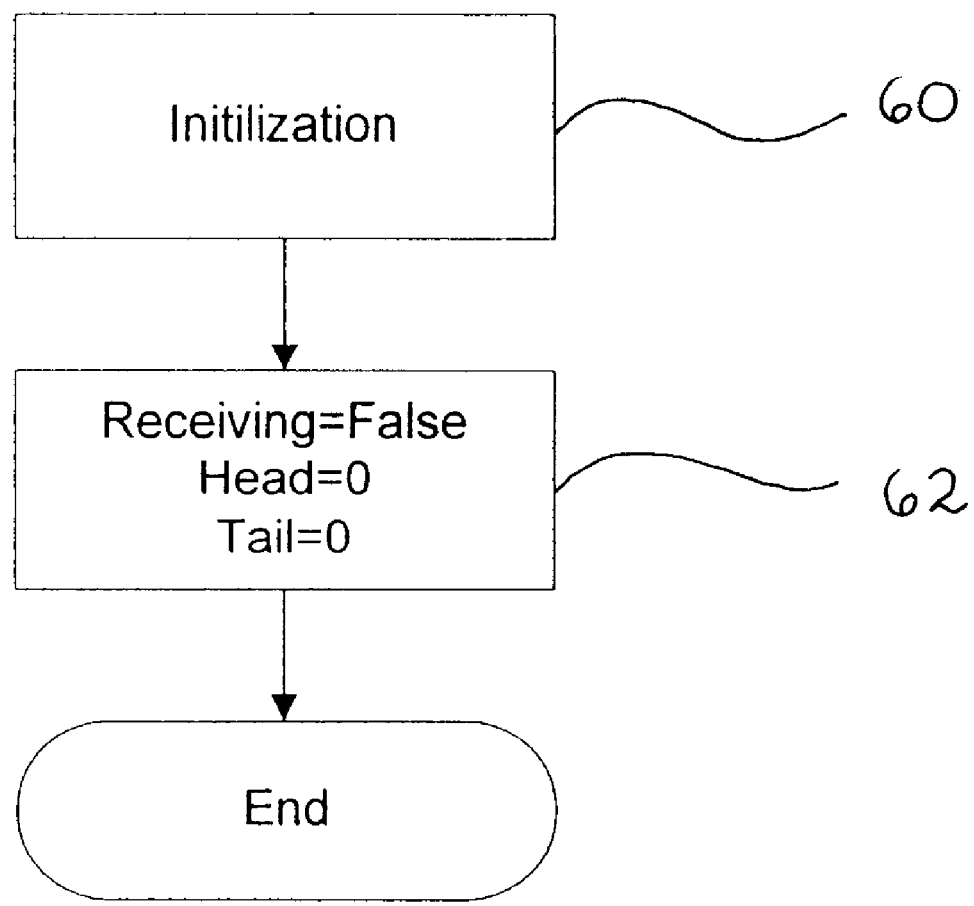
FIGS. 5A–5D are flow charts representing the storage and receipt of time synchronization information loaded in the buffers of FIG. 4, according to the time synchronization device and method of the present invention.

Referring to FIGS. 5A–5D, utilization of the circular buffer structure (shown in FIG. 4) is described. Referring to FIG. 5A, according to known programming techniques, variables utilized herein are initialized (block 60). Thereafter, variable Receiving is set to false (block 62). The variable Receiving is utilized to indicate whether bytes of data, e.g., the time synchronization message, are being received into one of the buffers. A value of False indicates that bytes of data should be stored in the next buffer and the timestamp recorded. A value of true means that data should be stored in the current buffer. In addition, variables Head and Tail (shown also in FIG. 4) are set to zero (block 62). The variable Head points to the current buffer to store bytes, and the variable Tail points to the buffer where bytes are to be removed for processing.

Figure 5B:
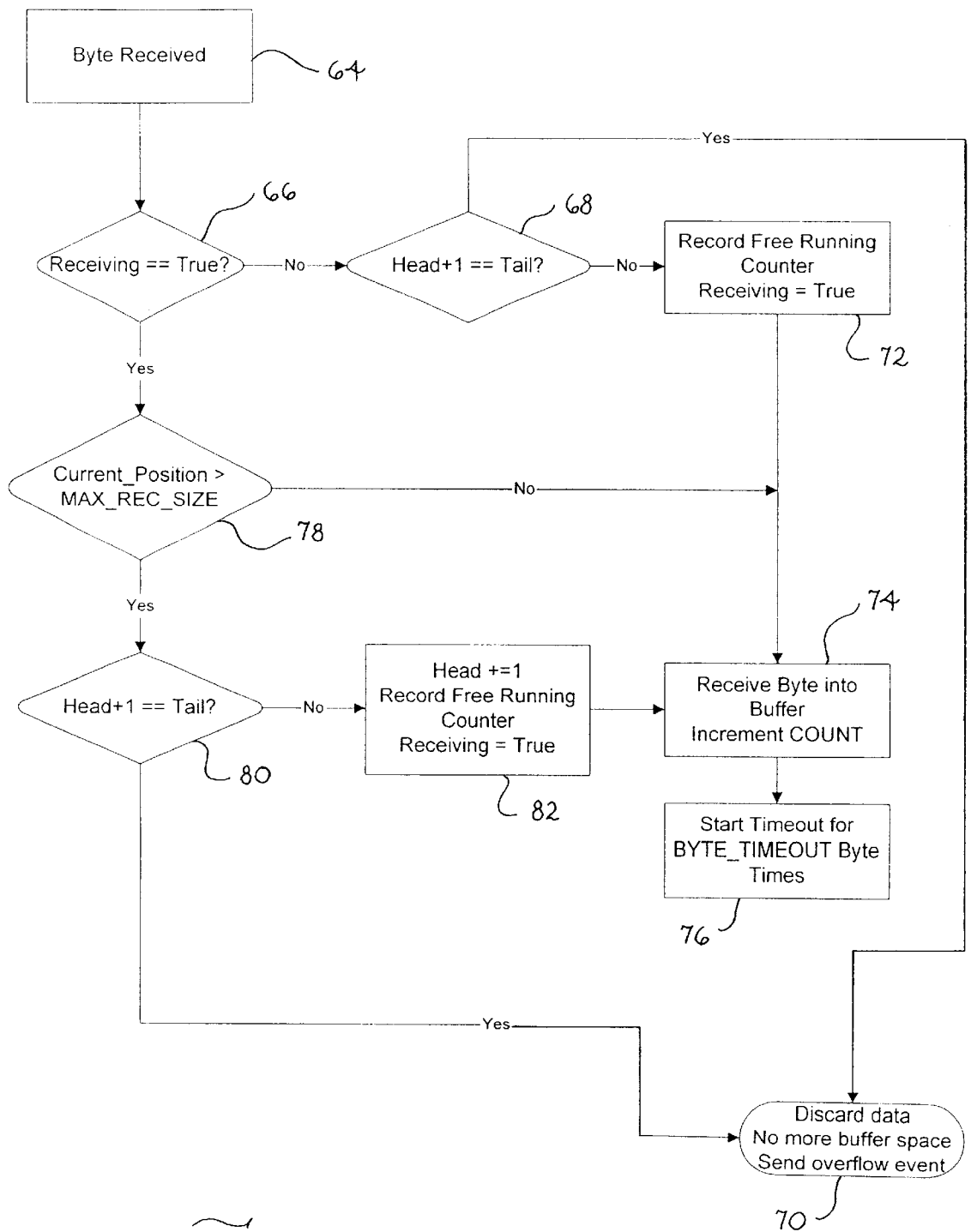

Referring to FIG. 5B, a routine runs when the receiver sends a byte of data, e.g., a byte of the time synchronization message, to the power monitor (block 64). Since Receiving initially equals false (block 66), next the routine determines whether an overflow condition occurs in the circular buffer (block 68). If Head plus one equals Tail, an overflow condition exists and the routine ends since there is no more buffer space available (block 70). Upon the overflow condition, all buffer data is discarded and an overflow event is set in the event log to inform a user that the overflow occurred (block 70).

If no overflow condition exists, a lower layer communication receiving function, for example, places the received byte into the buffer currently identified by the Head pointer and sets Receiving to True (block 72). A Rxd_In pointer (shown in FIG. 4) identifies the position within the buffer to store the received byte. Upon receipt of a first byte of the time synchronization message, the power monitoring device's communication port interrupt service routine takes a snap shot of a Free Running Counter and records the snap shot value into the Timestamp register (block 72). The Free Running Counter is a counter that is incremented by one each time a PIT interrupt service routine is executed. Artisans will appreciate that any counter can be used that increments at a rate at least as fast as the rate of the PITs. The Free Running Counter value is stored for later use by an upper layer communications processing function to calculate a processing delay when setting the internal clock, as described below.

Each time a byte is received in the buffer, a counter located in the Count element of the buffer (refer to FIG. 4) is incremented to represent the number of valid bytes in the Data portion of the buffer (block 74). The upper layer communication processing function saves time and processing power by utilizing the count value to identify the number of valid bytes in the Data portion of the buffer without removing all 300 bytes of data.

Thereafter, the lower layer communication receiving function implements an end of Data packet timeout mechanism (block 76). The timeout mechanism is controlled by BYTE_TIMEOUT which recognizes when the end of the time synchronization message occurs. BYTE_TIMEOUT happens when no bytes of data are received by the power monitor for a predetermined duration of time. In the preferred embodiment, a BYTE_TIMEOUT occurs when the power monitor receives no data for four consecutive byte times. At 9600 baud, one byte time occurs approximately every millisecond, thus, after four byte times four milliseconds have elapsed.

Since the receiver transmits bytes of the time synchronization message back to back, a delay of four byte times without data ensures that an end of the data packet was reached. Artisans will appreciate, however, that a duration other than four bytes can be used, as long as the selected duration is not greater than the frequency at which the GPS sends packets, e.g., every one second.

When the power monitor receives the next byte of the time synchronization message (block 64), Receiving equals True (block 66). Thereafter, the lower level communication receiving function determines whether the Rxd_In pointer is greater than the maximum data size, e.g., 300 bytes (block 78). If unused Data buffer space remains, the lower level communication receiving function adds the incoming byte to the buffer and increments the Count packet counter (block 74). Thereafter, the timer for the BYTE_TIMEOUT is started (block 76).

If the Rxd_In pointer is greater than the available limit, the lower level communication receiving function determines whether the Head buffer has reached the Tail buffer (block 80). If Head has caught Tail, an overflow a condition exists and the routine ends since there is no more buffer space (block 70). Upon the overflow condition, all buffer data is discarded and an overflow event is set in the event log to inform the user that the overflow occurred (block 70).

If the overflow condition does not exist (block 80), the lower level communication receiving function increments Head to begin saving data in the next buffer since the previous buffer is full (block 82). In addition, the lower level communication receiving function saves a snap shot of the Free Running Counter to the Timestamp packet and sets Receiving to True (block 82). Thus, the lower level communication receiving function records each time synchronization message into separate buffers and timestamps the reception of the first byte in the buffer to preserve the start time of the packet which is used during packet processing, described below. This repeats until all buffers are filled and then loops back to the first buffer.

Figure 5C:
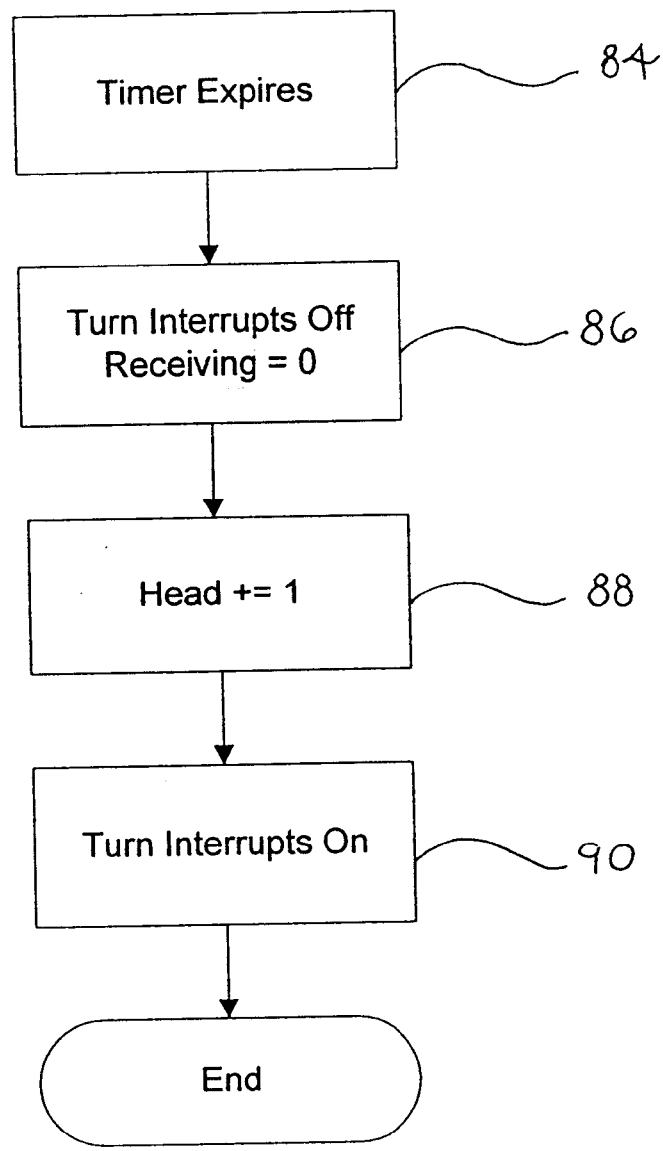

Referring to FIG. 5C, the lower level communication receiving function prepares for the next time synchronization message after the BYTE_TIMEOUT occurs (block 84). As described above, the BYTE_TIMEOUT takes place when a time has expired wherein no bytes were received, e.g. after 4 milliseconds since the last byte was received. To prepare for the next time synchronization message, interrupts are turned off to keep other routines from altering the Head variable, and Receiving is set to False to indicate that no bytes are being received (block 86). Thereafter, the variable Head is incremented so that the time synchronization messages are kept separate (block 88), and the interrupts are turned back on (block 90).

Figure 5D:
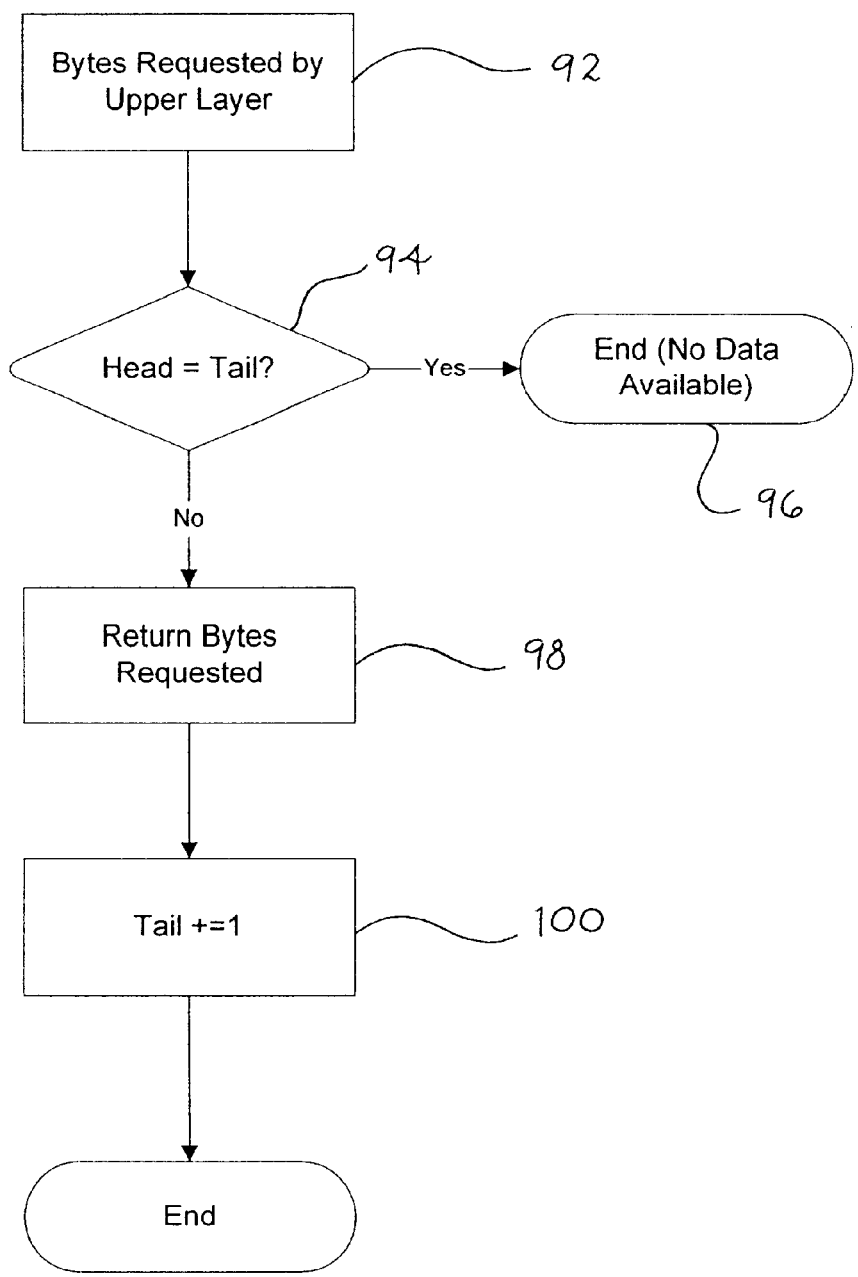

Referring to FIG. 5D, when a buffer is full or the BYTE_TIMEOUT has occurred, the upper layer communications processing function receives an event, for example, indicating the arrival of a new time synchronization message. Thereafter, the upper layer communications processing function requests the bytes from the buffer number indicated by Tail (block 92). To determine whether data is available, the upper layer communications processing function determines whether Head equals Tail (block 94). If Head equals Tails, the routine ends because there is no data available (block 96).

If Head does not equal Tail, the upper layer communications processing function removes bytes from the buffer indicated by Tail (block 98). Pointer Rxd_Out (shown in FIG. 4) points to the next byte to be removed. As described above, the upper layer communications processing function utilizes the value in the Count packet to determine the number of valid bytes of data to remove from the Data packet. After removing the valid bytes, i.e., the time synchronization message, the variable Tail is incremented to indicate the next buffer to be read (block 100).

Referring to FIGS. 6A–6G, to avoid discontinuities and drift to the internal clock of the power monitor, the PIT is adjusted to either slow down or speed up the internal clock, each time the time synchronization message is processed. Slowing down and speeding up the internal clock ensures that the overall accumulation of time on the internal clock matches that of the master clock. As mentioned above there are 1024 PITs per second, each advancing the time by $\frac{1}{1024}$=976.5625 uS. If the system bus clock were exactly 16.777216 MHz then there would be exactly 1024 PITs per second. Since the system bus clock varies from unit to unit, the rate of time advance is adjusted. Since the number of PITs per second cannot be adjusted, the time advance of each PIT, i.e., time per PIT, is adjusted. The time per PIT is the time that is added to the power monitor's internal clock time each time a PIT interrupt occurs.

Figure 6A:
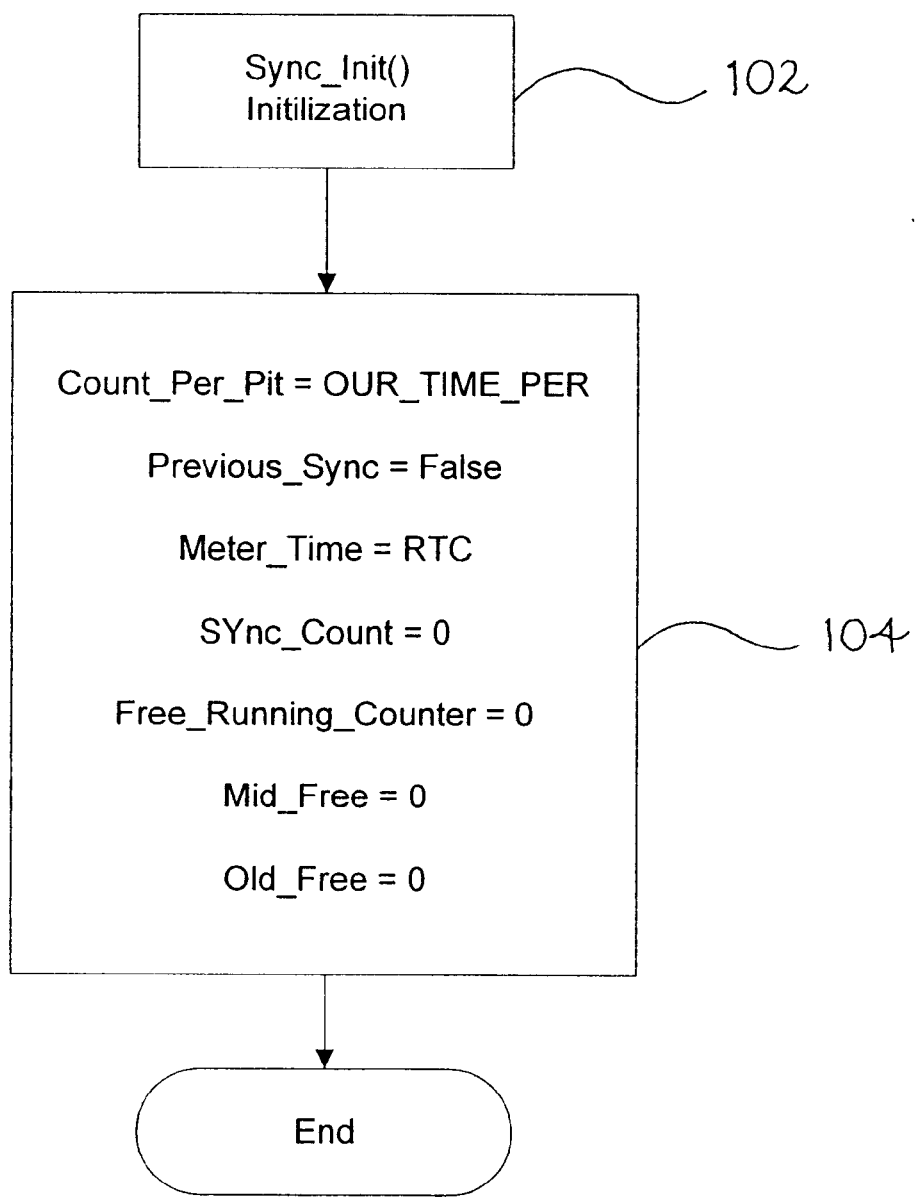
FIGS. 6A–6G are flow charts representing time synchronization of the power monitors to a universal time, according to a preferred embodiment of the present time synchronization device and method.

In a preferred embodiment of the present invention, adjustment of the time per PIT interrupt is accomplished according to the following routine. The routine is designed to minimize lock on time, i.e., the time that elapses before the internal time on the power monitor and the universal time on the master clock are within a time tolerance, and the effects of perturbations in the master clock. Referring to FIG. 6A, variables used during the routine are initialized (block 102) Count_Per_Pit is set to the calculated OUR_TIME_PER which indicates the time advance per PIT (block 104). The default value of OUR_TIME_PER for a 32.786 kHz crystal and PIT occurring every 976.5625 uS is 4194304. Thus, there are 1024 PIT ticks every second. Artisans will appreciate that other counts per PIT can be utilized.

The internal clock time of the power meter, i.e., Meter_Time, is set to a real time clock (RTC) which preferably runs on battery power to avoid the effects of a power outage (block 104). In addition, Previous_Sync is initially set to false (block 104). After two PIT Between Slope periods expire, Previous_Sync is set to true to enable slope calculations, described below. Sync_Count is initially set to zero and denotes the number of expired PIT Between Slope periods (block 104). Mid_Free and Old_Free are variables that store old values of Free_Running_Counter to be used in the slope calculation described below. Free_Free_Running_Counter is initially set to zero (block 104).

Figure 6B:
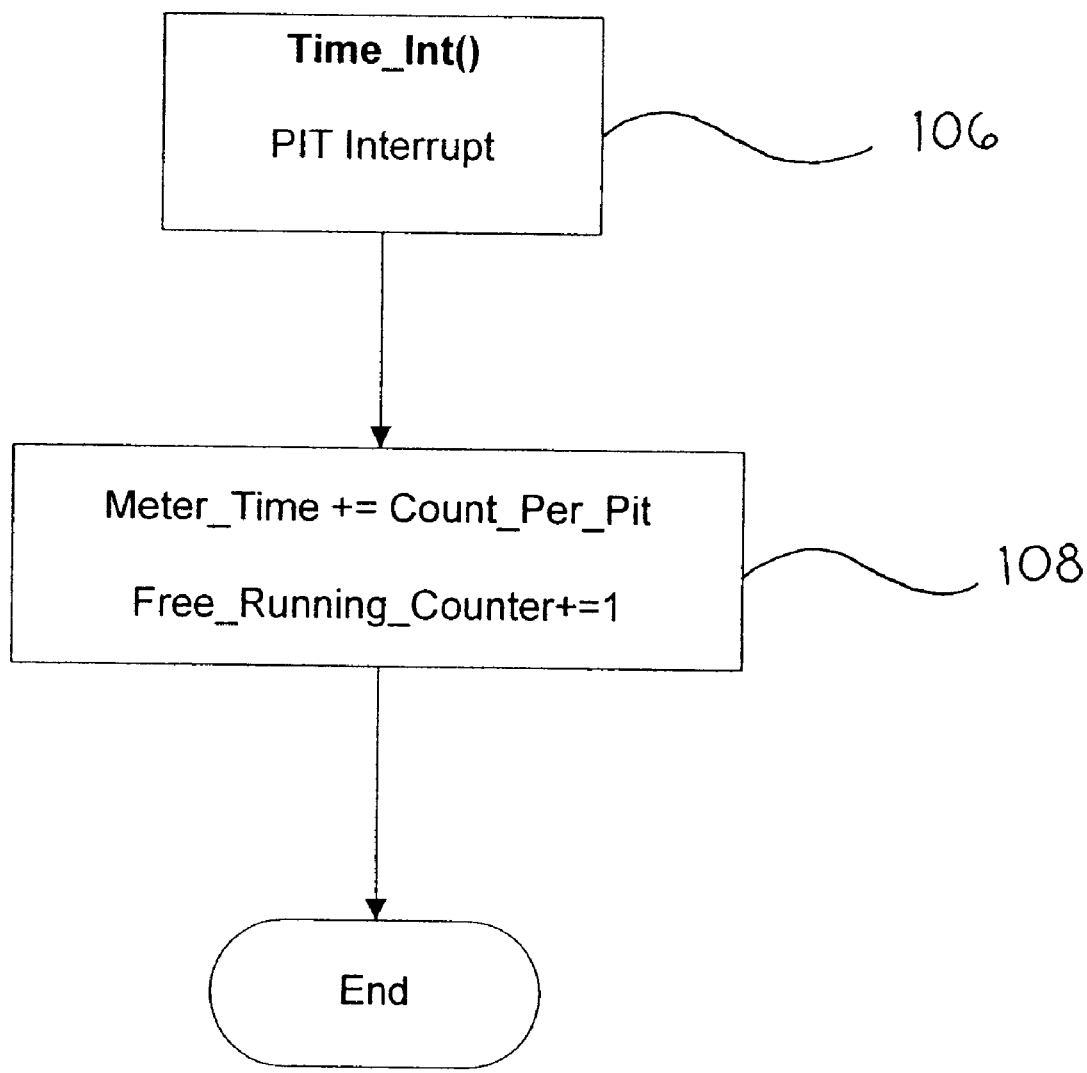

Referring to FIG. 6B, a Time_Into routine is triggered every time a Pit interrupt occurs (block 106). Upon the occurrence of the PIT interrupt, Meter_Time is incremented by the Count_Per_Pit and the Free_Running_Counter is incremented by one tick (block 108). The Free_Running_Counter is used to measure the time taken to get from one point in the routine to another point.

Figure 6C:
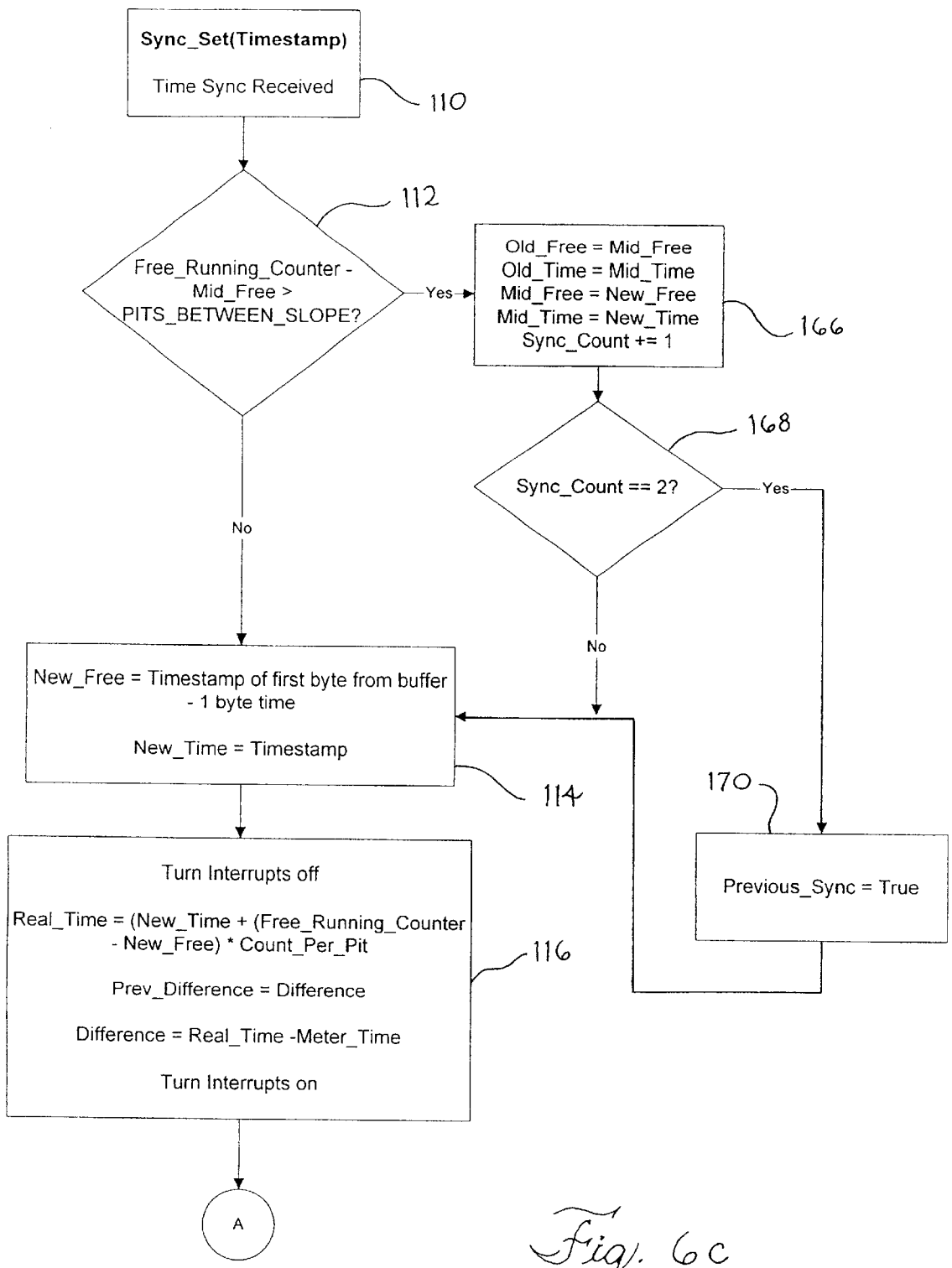

Referring to FIG. 6C, a Sync_Set( ) subroutine is triggered when the upper layer communication processing function receives a time synchronization message (block 110). The Timestamp contained in the Time Sync message (shown in FIG. 3) is sent as a parameter to the Sync_Set( ) routine. Upon receipt of a time synchronization message, the upper layer communication processing function determines whether a value for Free_Running_Counter minus Mid_Free is greater than PITS_BETWEEN_SLOPE (block 112). PITS_BETWEEN_SLOPE is a constant that is set to ensure that a predetermined time period elapses before the slope calculation is enabled. In the preferred embodiment, PITS_BETWEEN_SLOPE is set to allow for about a half hour to an hour between slope calculations. Artisans will appreciate that a sufficient amount of time is allowed to elapse between slope calculations, described below, to ensure that small inaccuracies in the time synchronization messages become insignificant compared to the time between the two points used for the slope calculation.

If the predetermined time period has not elapsed since the last slope calculation, New_Free is set to the value stored in the Timestamp register (shown in FIG. 4) minus one byte time, e.g., one millisecond (block 114). One byte time is subtracted since the routine timestamps the end of reception of the first byte, and the time of reception of the first bit is required. In addition, New_Time is set to the value contained in the Time Synch Message, New_Free indicates a snap shot of the Free Running Counter when the power monitor receives the first byte of the time synchronization message.

Thereafter, the internal clock of the power monitor is synchronized to the universal time. First, interrupts are turned off (block 116). Then, Real_Time is calculated to equal New_Time plus the difference between Free_Running_Counter and New_Free, and multiplied by the Count_Per_Pit to get the time (block 116). In addition, Prev_Difference is set to equal Difference, which has no value the first time through the routine (block 116).

Difference is Real_Time minus the Meter_Time, i.e., the calculated error between the universal time and the meter's internal clock time (block 116).

Figure 6D:
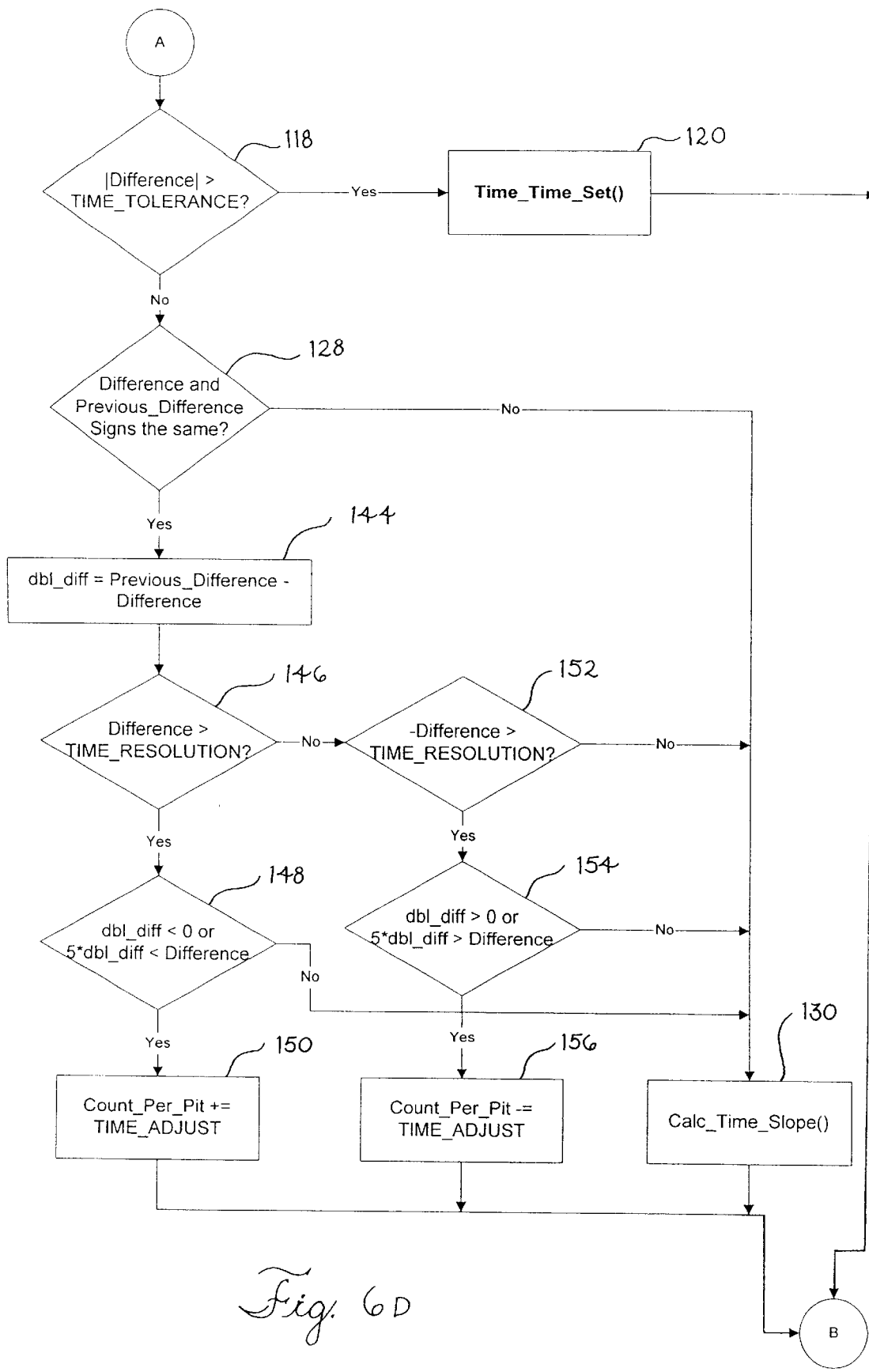

Referring to FIG. 6D, preferably the internal clock time is set directly to the universal time only when the difference between the power monitor's internal time and the universal time is more than a predetermined amount (TIME TOLERANCE), e.g., one second (Block 118). Continuous direct setting of the internal time to the universal time is not preferred since this causes drift and discontinuities in the internal time. Direct setting of the internal clock to the universal time is performed, however, to speed up the interval required to lock to the master clock when the times differ by more than one second. If direct setting of the internal clock were not performed, depending on the time difference, the negative effects of a long locking time outweigh the effects of performing a discrete time set.

Figure 6E:
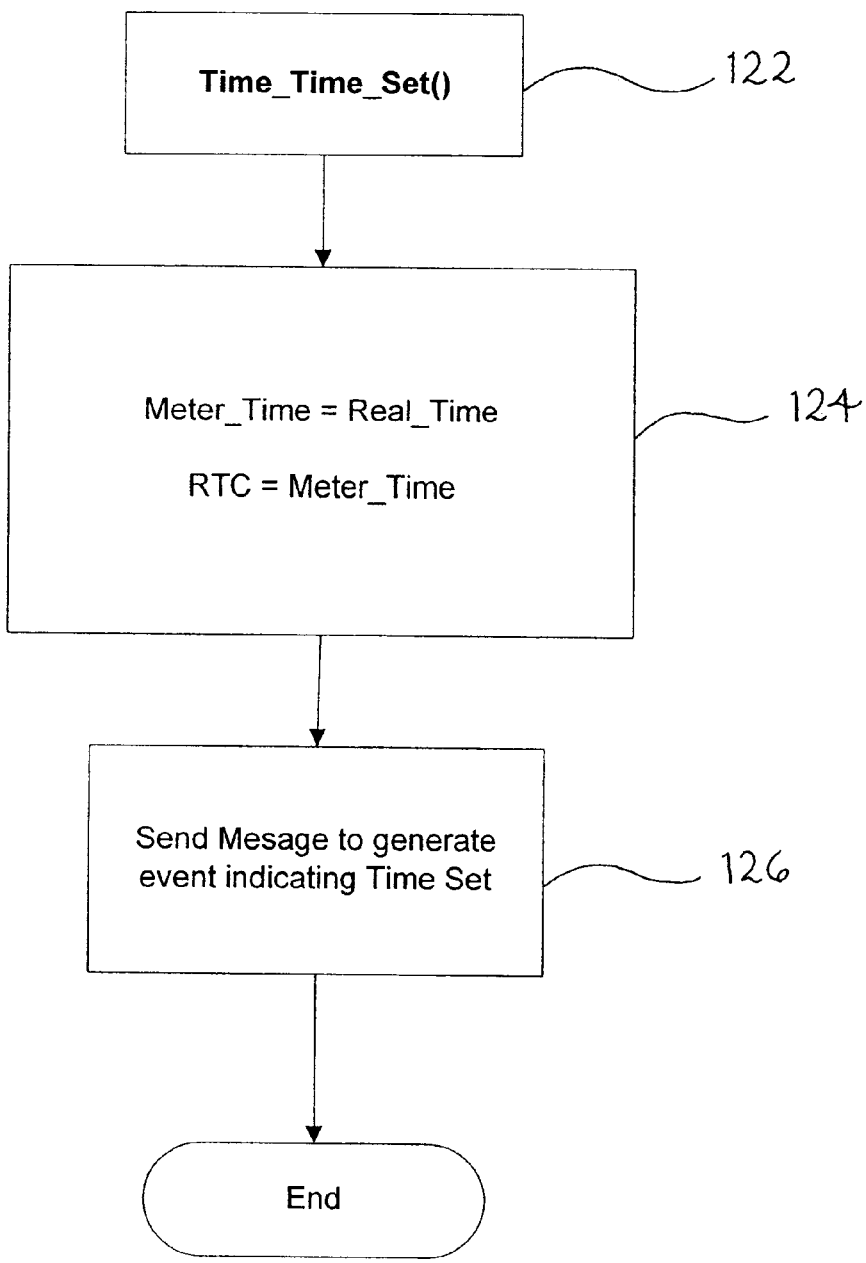

Thus, the upper layer communication processing function determines whether the absolute value for Difference is greater than TIME_TOLERANCE, e.g., one second (block 118). If the universal time and the power monitor's internal time differ by more than one second, the upper layer communication processing function calls a Time_Time_Set( ) routine (block 120). Referring to FIG. 6E, the Time_Time_Set routine begins (block 122). Meter_Time is set to Real_Time, and the RTC is set to Meter_Time (block 124). In addition, a message is sent to generate an event to indicate to a user that a time set has occurred (block 126).

Returning to FIG. 6D, if the universal time and the power monitor's internal time differ by less than a second, then the routine determines whether the internal clock is slow or fast to adjust the time per PIT accordingly. First, Difference and Previous_Difference are compared to determine if they are the same sign (block 128). If they are not the same sign, then the internal time has crossed over from being to slow to being too fast or visa versa. The crossover from too fast to too slow, or visa versa, is an indication that the universal time and the internal time are nearly synchronized. Thus, the Count_Per_Pit is adjusted more precisely by utilizing the slope calculation (block 130).

Figure 6F:
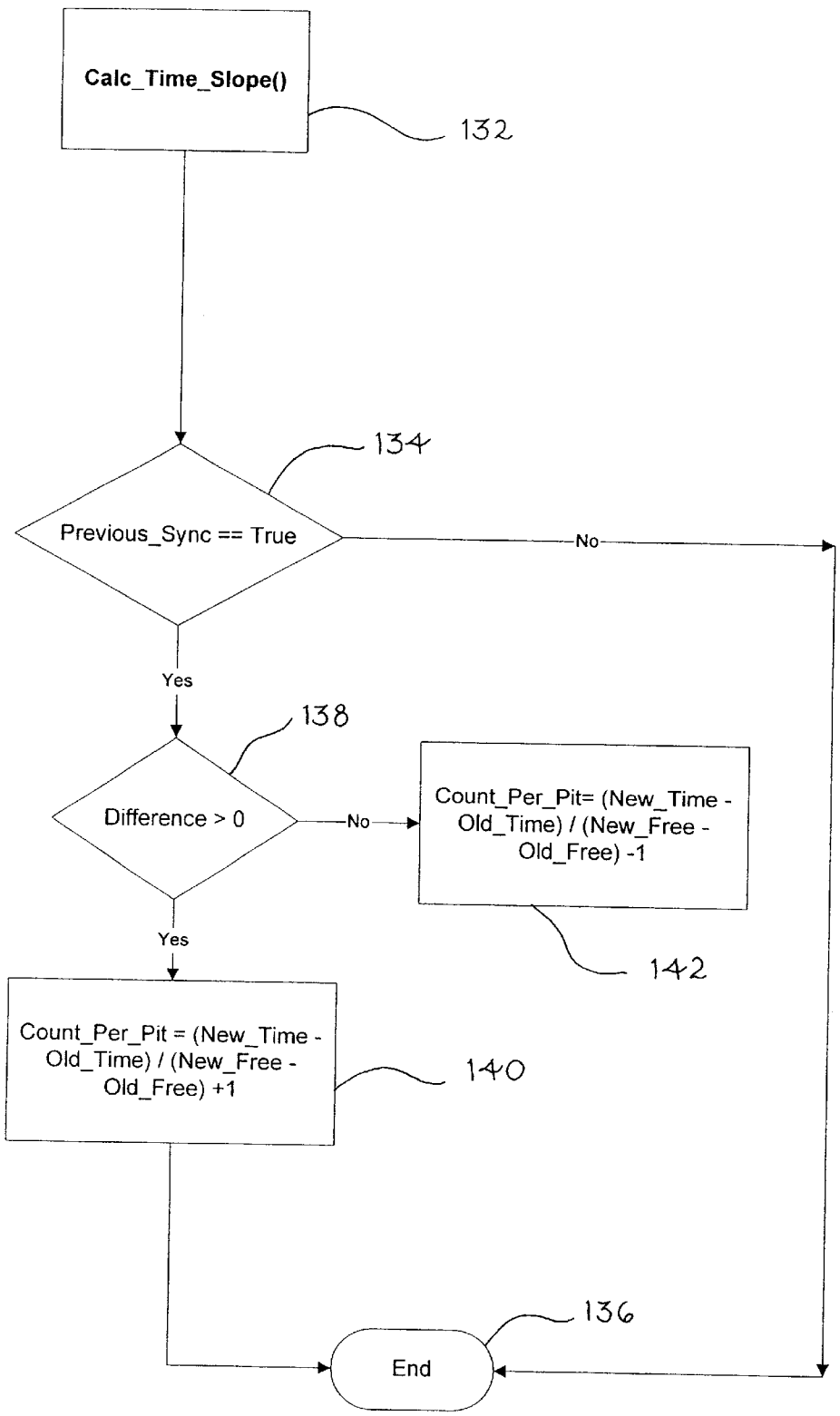

Referring to FIG. 6F, shown is an exemplary Calc_Time_Slope( ) routine for calculating the PIT count based on slope (block 132). First, the upper layer communication processing function determines whether Previous_Sync equals True, i.e., whether enough time has expired so that the difference in time between the two points used in the slope calculation is insignificant compared to the error in the timestamps being received (block 134). It can be appreciated that slope cannot be calculated with only one point of reference. Thus, if the power monitor has not received and indication that at least two PIT between Slope periods have expired, the Calc_Time_Slope( ) routine ends (block 136).

If Previous_Sync equals True, however, the upper layer communication processing function determines whether Difference is greater than zero, i.e., whether the internal time is running slow (block 138). If the internal time lags the universal time, then the Count_Per_Pit is incremented by an integer, e.g., the integer one (block 140). In particular, Count_Per_Pit is calculated as the difference between the new and previous time synchronization times divided by the difference between the new and old stored value of the Free_Running_Counter, plus one tick (block 140). If the internal time is running fast, Count_Per_Pit is calculated as the difference between the new and previous time synchronization times divided by the difference between the new and old stored value of the Free_Running_Counter, minus one tick (block 142). The addition or subtraction of one tick ensures that drift is in the correct direction before the next slope calculation which preferably occurs when the next timesync message is received.

Referring again to FIG. 6D, if the internal time has not crossed over from being too slow to too fast, or visa versa, the upper layer communication processing function calculates dbl_diff, double difference (block 144). dbl_diff is the rate of change of Difference, which is the difference between the universal time and the power monitor's internal time. Thus, dbl_diff equals Previous_Difference minus Difference (block 144).

Thereafter, Difference is compared to TIME_RESOLUTION, e.g., 1 millisecond, which is the allowable error (block 146). If Difference is greater than TIME_RESOLUTION, then the upper layer communication processing function determines whether the rate of change is in the wrong direction (dbl_diff less than zero) (block 148). In addition, the upper layer determines whether the rate of change is insignificant with respect to the Difference between the universal time and the internal time (5*dbl_diff less than Difference) (block 148). If either the rate of change is in the wrong direction or is insignificant with respect to Difference, the Count_Per_Pit is incremented by TIME_ADJUST, e.g., one tick to speed up the internal clock (block 150). Otherwise, if the rate of change is in the correct direction and is significant compared to Difference, the Calc_Time_Slope( ) routine is performed, as described above, to determine a precise rate of change (block 130).

If Difference is not greater than TIME_RESOLUTION, the upper layer communication processing function determines whether negative Difference is greater than TIME_RESOLUTION (block 152). In other words, whether the difference between the universal time and the internal time is small. If negative Difference is not greater than TIME_RESOLUTION, i.e., the difference in time is small, then the Calc_Time_Slope( ) routine is performed to fine tune Count_Per_Pit, as described above (block 130).

If negative Difference is greater than TIME_RESOLUTION, then the upper layer communication processing function determines whether the rate of change is in the wrong direction (dbl_diff greater than zero) (block 154). In addition, the upper layer determines whether the rate of change is insignificant with respect to the Difference between the universal time and the internal time (5*dbl_diff greater than Difference) (block 154). Of course, a factor other than 5 can be used. A change to the factor affects lock on time and overshoot depending on the frequency with which timesync messages are being received. In other words, the number 5 is a compromise based on the typical rate of timesync reception.

If either the rate of change is in the wrong direction or is insignificant with respect to Difference, the Count_Per_Pit is decreased by TIME_ADJUST, e.g., one tick (block 156). Otherwise, if the rate of change is in the correct direction and is significant compared to Difference, the Calc_Time_Slope( ) routine is performed, as described above (block 130).

Figure 6G:
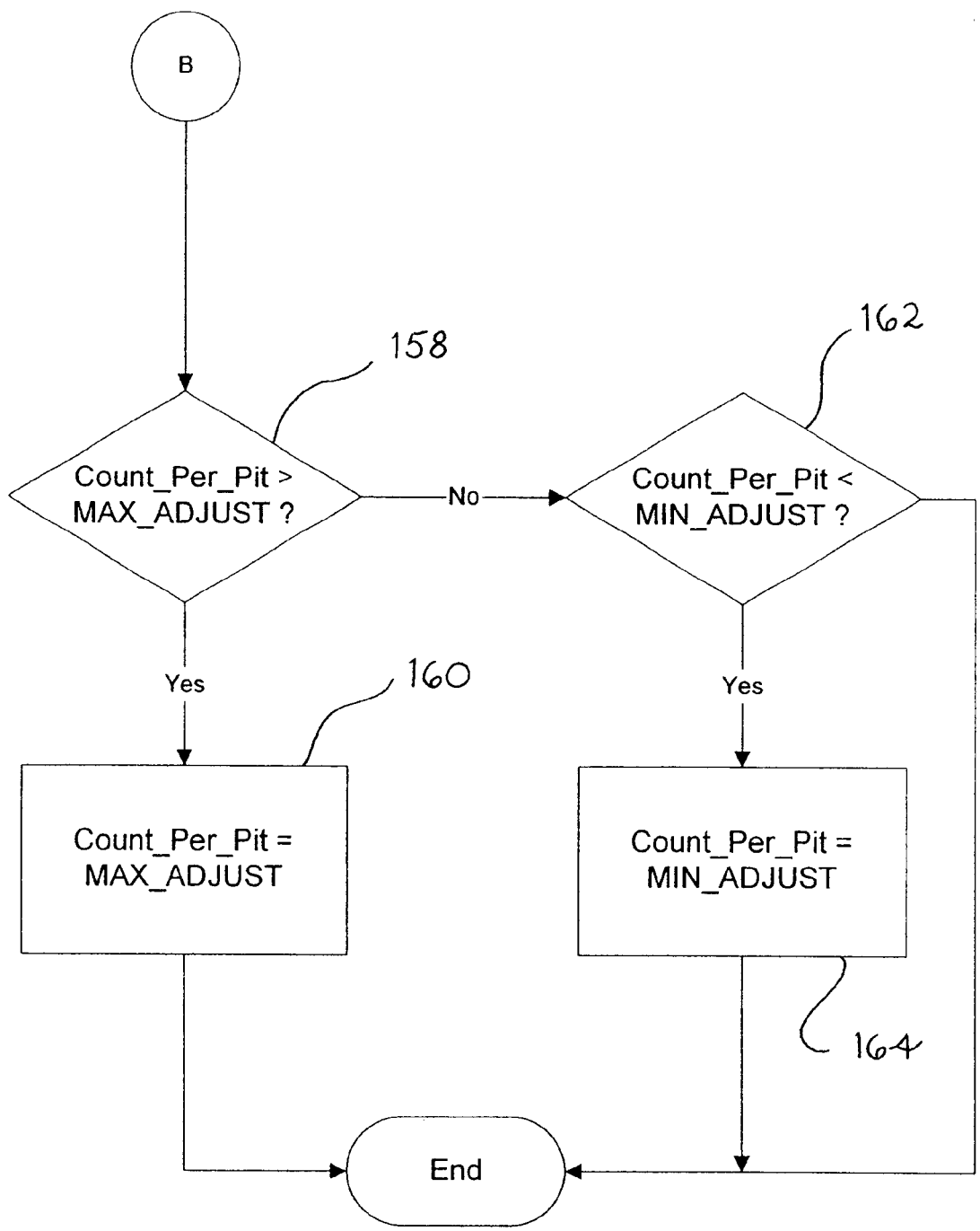

Referring to FIGS. 6D and 6G, after Count_Per_Pit is incremented (block 150) or decreased (block 156), the Calc_Time_Slope( ) routine is performed (block 130) or the Time_Time_Set( ) routine is performed (block 120), Count_Per_Pit is compared to MAX_ADJUST (block 158). This comparison ensures that Count_Per_Pit remains within a range of the default count, e.g., 4194304, after Count_Per_Pit is adjusted. Maintaining the Count_Per_Pit within a range lends stability to the internal clock. Thus, if Count_Per Pit is greater than MAX_ADJUST, e.g., the default Count_Per_Pit plus 50 ppm, Count_Per_Pit is set to MAX_ADJUST (block 160). If Count_Per_Pit is less than or equal to MAX_ADJUST, then Count_Per_Pit is compared to MIN_ADJUST to determine whether Count_Per_Pit is less than a minimum allowable PIT count value (block 162). If Count_Per_Pit is less than the minimum allowable PIT count value, then Count_Per_Pit is adjusted to equal MIN_ADJUST, e.g., Count_Per_Pit minus 50 ppm (block 164). Artisans will appreciate that the values for MAX_ADJUST and MIN_ADJUST are implementation dependent, and other values can be utilized.

Referring again to FIG. 6C, if Free_Running_Counter minus Mid_Free is greater than PITS_BETWEEN_SLOPE (block 112), SYNC_COUNT is incremented by the integer one, for example, and variables are updated that contain values for the old, middle and new Free_Running_Counter snap shots (block 166). Thereafter, the upper layer communication processing function determines whether the power monitor has been notified that two PIT Between Slope periods have expired (block 168). If two PIT Between Slope periods have expired, Previous_Sync is set to True to enable the slope calculation routine described above (block 170). If two PIT Between Slope periods have not expired, however, the slope calculation subroutine remains disabled since not enough time has elapsed to get an accurate slope calculation. It can be appreciated that if the accuracy of the incoming time synchronization messages is +/−1 msec and a calculation is desired of Count_Per_Pit to within 1 ppm, points two million times further apart than 1 msec are necessary, i.e., 2000 (33.3 minutes). Thereafter, the upper layer communication processing function adjusts the free running counter value from the Time Sync Message and stores the adjusted value in New_Free, as described above (block 114).

For simplicity purposes, the foregoing description utilized a free running counter that increments at rate equal to that of the PIT. It can be appreciated that if the processor being utilized provides a free running counter that increments at a greater rate than that of the PIT, the accuracy can be improved beyond the 1/1024 described stated above. Higher accuracy is accomplished by recording the value of such a free running counter each time the PIT interrupt service routine is executed. Then, when a code segment requests the time, the time is calculated by adding the difference between the current free running counter value and that recorded in the last PIT interrupt service routine call. After calculating the difference, the result is converted to the standard seconds representation and added to the time on the meter that was calculated in the last PIT interrupt service routine call.

Figure 7:
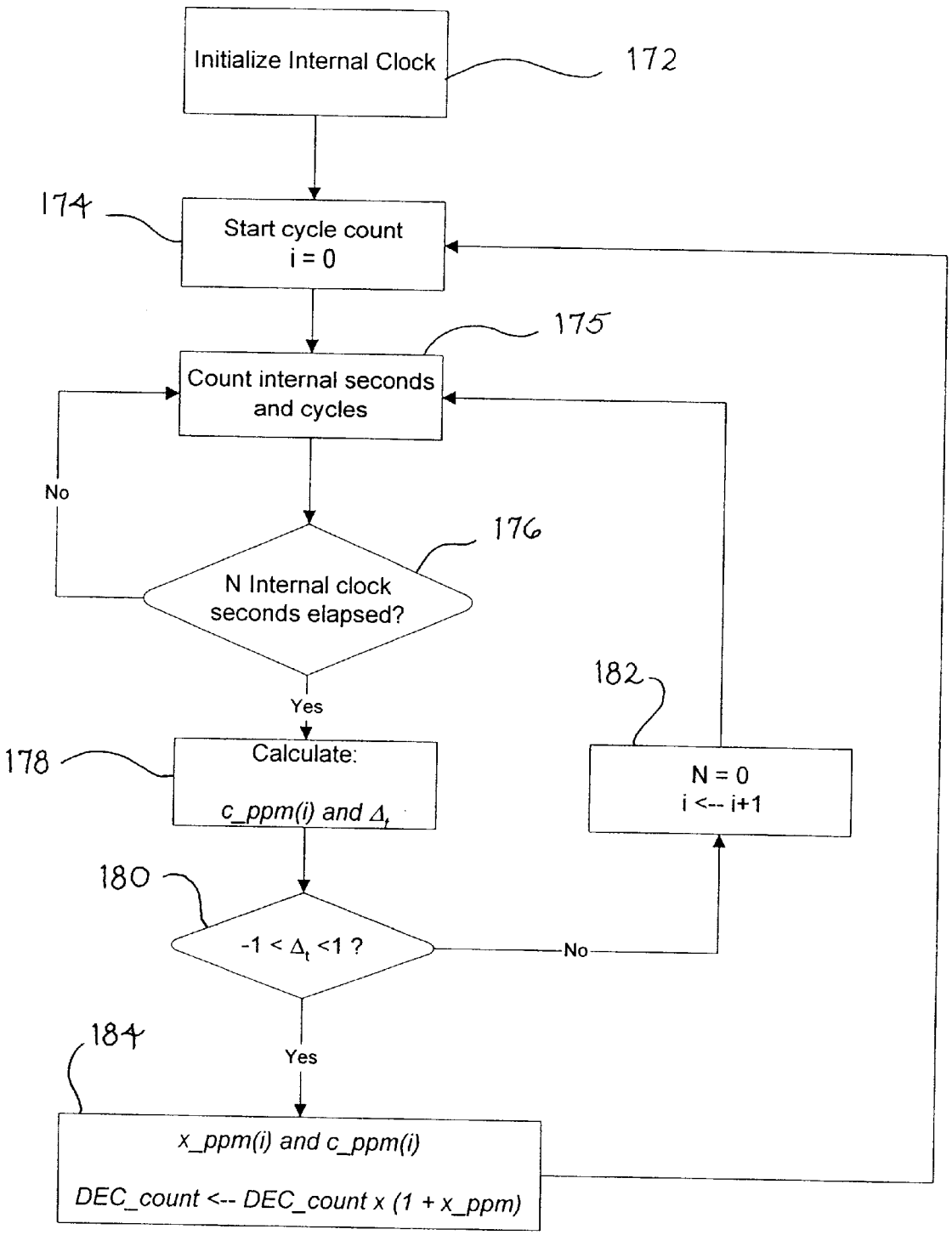
FIG. 7 is a flow chart representing time synchronization to a line frequency, according to a preferred embodiment of the present time synchronization device and method.

Referring to FIG. 7, a routine of the present invention is shown to synchronize power monitors' internal clocks to line frequency. It is contemplated that time synchronization is first performed, for example, according to the above described method to set an absolute time. Thereafter, the following routine can be used to maintain the internal clock's synchronization.

The routine begins by initializing the internal clock, e.g., a virtual clock stored in memory, to the RTC (block 172). For the purposes of discussing the line frequency synchronization device and method of the present invention, the internal clock utilizes a decrement register which produces an interrupt every 3123 ticks as derived from a 32.768 kHz crystal. Each time a DEC interrupt occurs, the internal clock is advanced by one millisecond. Artisans will appreciate that other clocking mechanisms can be used to represent the internal clock.

Since the crystal triggers the ticks that decrement the counter, an accuracy of the internal clock is determined by the crystal's accuracy. Crystal error (x_ppm), is defined as:

$$x\_ppm = \frac{F^O_{XTAL} - F_{XTAL}}{F^O_{XTAL}} \cdot 10^6$$

where $F^O$ corresponds to the nominal frequency of the crystal and $F_{XTAL}$ is the actual frequency of the crystal. When x_ppm is greater than zero, the time of the power monitor's internal clock lags the universal time, and when x_ppm is less than zero, the internal time leads the universal time.

Since crystal error cannot be normalized, the value loaded into the decrement counter is adjusted to synchronize the internal clock to universal time. Universal time, ticks or seconds, is determined from a line frequency input to the power monitor, for example, by counting 60 cycles of the line voltage to mark exactly one second if the nominal value of line frequency is 60 Hz. Line frequency, however, is not fixed and deviates from the nominal frequency, e.g., 60 Hz. Obviously, such irregularity in line frequency affects the accuracy of the internal clock adjustment. Utilities periodically compensate, however, for the variations in the line frequency, so that over a twenty four hour time period, for example, the consumer receives an average line frequency of exactly 60 Hz. Therefore, over time counting error is introduced due to fluctuations in the line frequency as well as the drift in line frequency. In the long term, however, counting error emanating from the line frequency is diminished due to the utility's periodic compensation.

The timestamp device and method of the present invention determines when the line frequency compensation occurs to calculate a line frequency counting error (c_ppm) and to adjust the count number loaded into the decrement register accordingly, as described below. When line frequency compensation occurs, line frequency error (l_ppm) averages to zero, where:

$$c\_ppm = \frac{\text{Expected cycle count} - \text{Actual cycle count}}{\text{Expected cycle count}} \times 10^6;$$

and $$l\_ppm = \frac{f_O - f}{f_O} \cdot 10^6.$$

where $f_O$ is the expected nominal line frequency, e.g., 60 Hz, and f is the actual line frequency which the power monitor received.

Figure 8:
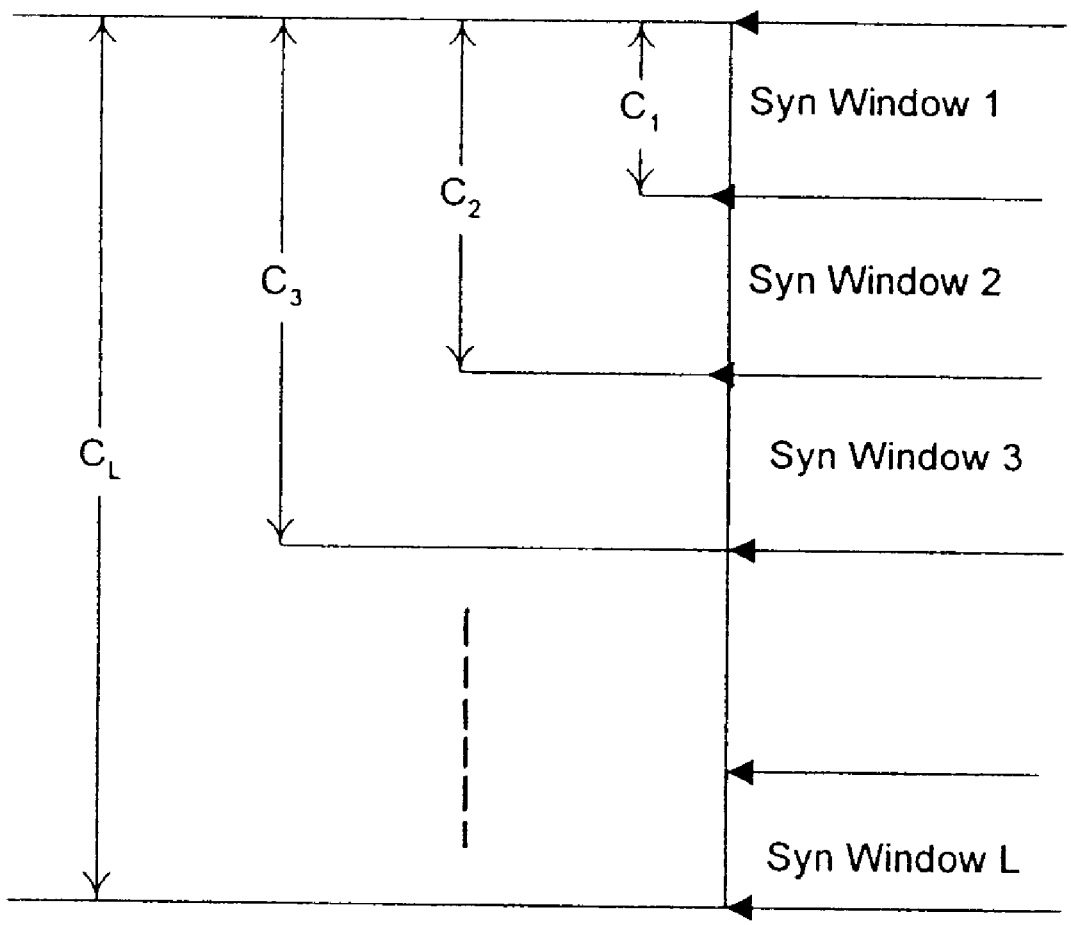
FIG. 8 shows line frequency synchronization windows representing time periods to perform calculations according to a preferred embodiment of the present time synchronization device and method.

After the internal clock is initialized, known circuitry is used to ascertain an Actual cycle count (represented by $C_i$ in FIG. 8) of the line frequency (block 174). The Actual cycle count is determined, for example, by counting cycles of line voltage which is generally a sinusoidal wave, for a predetermined duration (block 175). Referring to FIGS. 7 and 8, a synchronization window ends when the predetermined time period elapses, according to the internal clock (block 176). Preferably, the predetermined time period is about 3600 seconds, i.e., one hour, to acquire the resolution necessary to observe, for example, a 5 ppm error in the line frequency. A shorter predetermined time period, such as one half hour in terms of internal clock seconds, may not supply a sufficient number of cycle counts to observe the 5 ppm error. In addition, a predetermined time period longer than one hour, such as five hours, decreases accuracy of the internal clock since it is harder to pinpoint when the line frequency compensation occurred.

At the end of each synchronization window, calculations are performed to determine the cycle counting error (c_ppm) and whether a utility time compensation of the line frequency has occurred (block 178). To determine whether the time compensation of the line frequency has occurred, let:

$$\Delta_i = c\_ppm(i) - c\_ppm(i-1).$$

where i is the number of the ith time synchronization window at which the calculation are performed. In addition, c_ppm(i) and c_ppm(i−1) denote the counting errors for the period up to and including the ith window and the (i−1)th window respectively. It can be appreciated that Expected cycles for the ith window equals i multiplied by the number of elapsed seconds multiplied by the nominal frequency $f_O$.

To determine whether the utility has performed the line frequency time compensation during the synchronization window, the difference ($\Delta_i$) is calculated between the line frequency counting error (c_ppm) of the current synchronization window and the previous synchronization window. On the one hand, if $-1 < (\Delta_i) < 1$ is not true (block 180), for example, line frequency compensation has not occurred. Since ($\Delta_i$) is expressed in ppm, the conditions $-1 < (\Delta_i) < 1$ indicates that the accumulated line frequency error is within one ppm, which is a small error. Of course other ranges could be used. Thus, the cycles continue to be counted, and the counts contained in the decrement register are not adjusted (block 182).

On the other hand, if the difference ($\Delta_i$) is between −1 and 1 (block 180), the utility performed the line frequency compensation, and the line frequency error (l_ppm) averages zero over the observed window. Since counting error (c_ppm) is a combination of line frequency error (l_ppm) and crystal error (x_ppm), according to the formula c_ppm=l_ppm−x_ppm, when line frequency error (l_ppm) averages zero, crystal error (x_ppm) equals counting error (c_ppm). To synchronize the internal clock to the universal time, the PIT counts are adjusted by the crystal error (x_ppm), which is determined by calculating (c_ppm (i)) (block 184). The internal clock is synchronized to the line frequency by adjusting the counter located in the decrement register (block 184). Thereafter, the cycle counting begins again (block 174).

From the foregoing description, it should be understood that an improved time synchronization device and method has been shown and described which has many desirable attributes and advantages. Such time synchronization provides for an accurate sequence of fault recording. In addition, the present device and method speeds up or slow down a rate at which the internal clock time proceeds to avoid discontinuities and drift associated with merely changing the internal time to equal the universal time.

It is to be understood that changes and modifications to the embodiments described above will be apparent to those skilled in the art, and are contemplated. It is therefore intended that the foregoing detailed description be regarded as illustrative rather than limiting, and that it be understood that it is the following claims, including all equivalents, that are intended to define the spirit and scope of this invention.

What is claimed is:

1. A time synchronization device of a power monitor for synchronizing a time of an internal clock to a line frequency, the internal time advancing at a predetermined rate, the device comprising:

a counter operative to count cycles of the line frequency after each elapse of a predetermined time period, said elapse of said predetermined time period defining a present window and a previous window;

a processor operative to calculate a counting error and a change in counting error, said change in counting error being the difference of a counting error calculated for said present window and a counting error calculated for said previous window;

wherein said processor detects when said change in counting error is within a predetermined range; and adjusting means for adjusting the internal clock to the line frequency according to said counting error calculated for said present window when said change in counting error is within said predetermined range.

2. The device according to claim 1, wherein said adjusting means modifies the count of a decrement counter that keeps time for the internal clock.

3. A method for synchronizing a time of an internal clock to a periodically stable frequency which provides accurate time intervals, the method comprising the steps of:

counting cycles of the periodically stable frequency after each elapse of a predetermined time period, said elapse of said predetermined time period defining a present window and a previous window;

calculating a counting error and a change in counting error, said change in counting error being the difference of a counting error calculated for said present window and a counting error calculated for said previous window;

detecting when said change in counting error is within a predetermined range; and adjusting the internal clock to the periodically stable frequency according to said counting error calculated for said present window, when said change in counting error is within said predetermined range.

4. The method according to claim 3, wherein said predetermined period is about 3600 seconds.

5. The method according to claim 3, wherein said predetermined range is about minus one to one.

6. The method according to claim 3, further comprising the steps of:

receiving a time synchronization message from an entity at a first free running counter count, said time synchronization message containing a universal time when the time synchronization message was sent;

processing said time synchronization message at a second free running counter count to determine said universal time.

7. The method according to claim 6, wherein said entity is a master computer.

8. The method according to claim 6, wherein said entity is a global positioning system.

9. A method of maintaining time synchronization in a power monitoring device, the power monitoring device being coupled to a power system operating at a first frequency and comprising at least one processor operating at a second frequency, the method comprising:
  receiving at least one time message from a time source;
  accumulating counts in a free running counter in response to the second frequency; wherein said free running counter is implemented by said processor;
  advancing the internal time of the power monitoring device by a predetermined amount in response to said accumulation; and
  adjusting said amount in response to indications from a time synchronization source.

10. The method of claim 9 wherein said time synchronization source comprises said time source.

11. The method of claim 10 wherein said time synchronization source comprises a computer.

12. The method of claim 10 wherein said adjusting further comprises:
  determining a difference between said time message and said internal time;
  calculating a rate of change of said difference; and
  adjusting said amount in response to said difference and said rate of change.

13. The method of claim 10 further comprising:
  recording a first value of said free running counter in response to said receiving; and
  subtracting a second value of said free running counter from said first value to compensate for passage of time from said receiving to said adjusting.

14. The method of claim 9 wherein said time synchronization source comprises a computer.

15. The method of claim 9 wherein said time synchronization source comprises a global positioning system.

16. The method of claim 9 wherein said time synchronization source comprises said first frequency.

17. The method of claim 9 wherein said indications comprise periods of said first frequency.

18. The method of claim 9 wherein said indications comprise communication packets received from a master computer.

19. The method of claim 9 wherein said indications comprise communications packets received from a GPS receiver.

20. A method of maintaining synchronization between a clock in a power monitoring device and a clock in an entity, the power monitoring device being coupled to a power system, the method comprising:
  monitoring at least one power parameter in the power system with the power monitoring device;
  receiving an indication of time by the power monitoring device from said entity;
  implementing a free running counter with a processor within the power monitoring device;
  recording a value of the free running counter when the indication is received; and
  adjusting the rate of accumulation of time in the clock in the power monitoring device to track the clock in the entity.

21. The method of claim 20, further comprising:
  comparing said time in the clock in the power monitoring device with said indication of time, said comparison adjusted in accordance with an elapsed time between said receiving and said adjusting.

22. The method of claim 21, wherein said indication comprises a timestamp and an on time mark.

23. The method of claim 22, wherein said comparing further comprises:
  computing an adjusted difference in time between the clock in the power monitoring device and the clock in the entity;
  setting the clock in the power monitoring device directly to the timestamp if said difference is more than a predetermined amount; said timestamp being adjusted for the elapsed time between said receiving and said setting.

24. The method of claim 23, wherein said predetermined amount comprises about one second.

25. The method of claim 23, wherein said indication comprises a communications packet and said entity comprises a master computer.

26. The method of claim 25, wherein said adjusting is further in accordance with a rate of change of said difference from one reception to a next reception.

27. The method of claim 26, further comprising:
  recording a time of occurrence of a fault in the power system using the clock.

28. The method of claim 25, further comprising:
  recording a time of occurrence of a fault in the power system using the clock.

29. The method of claim 23, wherein the entity comprises at least one GPS satellite.

30. The method of claim 29, further comprising:
  recording a time of occurrence of a fault in the power system using the clock.

31. The method of claim 28, wherein said indication comprises a communications packet and the entity comprises a GPS receiver.

32. The method of claim 31, further comprising:
  recording a time of occurrence of a fault in the power system using the clock in the power monitoring device.

33. The method of claim 23, wherein said adjusting is further in accordance with a rate of change of said difference from one reception to a next reception.

34. The method of claim 33, wherein the entity comprises at least one GPS satellite.

35. The method of claim 33, wherein said indication comprises a communications packet and the entity comprises a GPS receiver.

36. The method of claim 20, wherein said indication comprises a communications packet and the entity comprises a master computer.

37. The method of claim 36, further comprising:
  recording a time of occurrence of a fault in the power system using the clock.

38. The method of claim 20, wherein the entity comprises at least one GPS satellite.

39. The method of claim 38, further comprising:
  recording a time of occurrence of a fault in the power system using the clock.

40. The method of claim 20, wherein said indication comprises a communications packet and the entity comprises a GPS receiver.

41. The method of claim 40, further comprising:
  recording a time of occurrence of a fault in the power system using the clock in the power monitoring device.

42. The method of claim 20, wherein said receiving further comprises:
  receiving a message comprising a timestamp and an on time mark; and recording a first value of the free running counter upon reception of said on time mark.

43. The method of claim 42, wherein said adjusting further comprises:
    recording a second value of said free running counter at a later time;
    calculating a first difference in time between said second value and said first value, said timestamp being adjusted for said first difference; and
    adjusting the rate of accumulation in accordance with a second difference in time between said timestamp and a time in the clock in the power monitoring device.

44. The method of claim 43, wherein said adjusting is further in accordance with a rate of change of said second difference from one reception to a next reception.

45. The method of claim 44, wherein said indication comprises a communications packet.

46. The method of claim 45, wherein said communications packet is generated by a GPS receiver.

47. The method of claim 46, further comprising:
    recording a time of occurrence of a fault in the power system using the clock.

48. The method of claim 45, further comprising:
    recording a time of occurrence of a fault in the power system using the clock.

49. The method of claim 43, further comprising:
    recording a time of occurrence of a fault in the power system using the clock.

50. The method of claim 42, further comprising:
    recording a time of occurrence of a fault in the power system using the clock.

51. A system for maintaining time synchronization between a plurality devices comprising:
    an entity, said entity comprising a master clock and said entity generating time synchronization messages;
    a plurality of power monitoring devices coupled to a power system; said power monitoring devices comprising:
        a receiver operative to receive said time synchronization messages from said entity;
        a processor operative to implement a clock and a free running counter;
            wherein said processor adjusts a rate of accumulation of time in said clock in response to the reception of said time synchronization messages; and
            wherein said processor monitors at least one power parameter in said power system.

52. The system of claim 51, wherein said processor compares the time in said clock with said time synchronization message; said comparison being adjusted in accordance with a processing time of said time synchronization message.

53. The system of claim 52 wherein said processor records a time of said clock when a fault occurs in said power system.

54. The system of claim 53 wherein said messages comprise communications packets.

55. The system of claim 54 wherein said entity comprises a master computer.

56. The system of claim 54 wherein said entity comprises a GPS receiver.

57. The system of claim 53 wherein said entity comprises at least one GPS satellite.

58. The system of claim 52 wherein said power monitoring devices are operative to record a power system event including said time in said clock when said event occurs.

59. The system of claim 58 wherein said time synchronization messages comprise communications packets.

60. The system of claim 59 wherein said entity comprises a master computer.

61. The system of claim 59 wherein said entity comprises a GPS receiver.

62. The system of claim 58 wherein said entity comprises at least one GPS satellite.

63. The system of claim 51 wherein said processor is operative to record the value of said free running counter when said messages are received and when said processor adjusts the rate of accumulation of time; and wherein said processor adjusts said time synchronization message for the difference between said two free running counter values before said processor adjusts the rate off accumulation of time.

64. The system of claim 63 wherein said processor adjusts the rate of accumulation of time in said power monitoring device in accordance with a difference in time between said clock and said time synchronization message and further wherein said processor adjusts the rate of accumulation of time in accordance with a rate of change of the difference in time.

65. The system of claim 51 wherein said processor records a time of said clock when a fault occurs in said power system.

66. The system of claim 65 wherein said messages comprise communications packets.

67. The system of claim 66 wherein said entity comprises a master computer.

68. The system of claim 66 wherein said entity comprises a GPS receiver.

69. The system of claim 65 wherein said entity comprises at least one GPS satellite.

70. The system of claim 51 wherein said power monitoring devices are operative to record a power system event including said time in said clock when said event occurs.

71. The system of claim 70 wherein said time synchronization messages comprise communications packets.

72. The system of claim 71 wherein said entity comprises a master computer.

73. The system of claim 71 wherein said entity comprises a GPS receiver.

74. The system of claim 70 wherein said entity comprises at least one GPS satellite.

75. A method of maintaining synchronizaton between a clock in a power monitoring device and a clock in an entity, the power monitoring device being coupled to a power system, the method comprising:
    monitoring at least one power parameter in the power system with the power monitoring device;
    receiving an indication of time by the power monitoring device from said entity;
    adjusting the rate of accumulation of time in the clock in the power monitoring device to track the clock in the entity;
    recording a time of occurrence of a fault in the power system using the clock:
    wherein the entity comprises at least one GPS satellite.

76. A method of maintaining synchronization between a clock in a power monitoring device and a clock in an entity, the power monitoring device being coupled to a power system, the method comprising:
    monitoring at least one power parameter in the power system with the power monitoring device;
    receiving an indication of time by the power monitoring device from said entity; wherein said receiving further comprises: receiving a message comprising a timestamp and an on time mark; and recording a first value of a free running counter upon reception of said on time mark;

adjusting the rate of accumulation of time in the clock in the power monitoring device to track the clock in the entity;

recording a second value of said free running counter at a later time;

calculating a first difference in time between said second value and said first value, said timestamp being adjusted for said first difference;

adjusting the rate of accumulation in accordance with a second difference in time between said timestamp and a time in the clock in the power monitoring device; and recording a time of occurrence of a fault in the power system using the clock.

77. A system for maintaining time synchronization between a plurality devices comprising:
an entity, said entity comprising a master clock and said entity generating time synchronization messages;
a plurality of power monitoring devices coupled to a power system; said power monitoring devices comprising:
a receiver operative to receive said time synchronization messages from said entity;
a processor operative to implement a clock;
wherein said processor adjusts a rate of accumulation of time in said clock in response to the reception of said time synchronization messages; and
wherein said processor monitors at least one power parameter in said power system;
wherein said processor compares the time in said clock with said time synchronization message; said comparison being adjusted in accordance with a processing time of said time synchronization message;
wherein said processor records a time of said clock when a fault occurs in said power system.

78. The system of claim 77 wherein said messages comprise communications packets.

79. The system of claim 78 wherein said entity comprises a master computer.

80. The system of claim 78 wherein said entity comprises a GPS receiver.

81. The system of claim 77 wherein said entity comprises at least one GPS satellite.

82. A system for maintaining time synchronization between a plurality devices comprising:
an entity, said entity comprising a master clock and said entity generating time synchronization messages;
a plurality of power monitoring devices coupled to a power system; said power monitoring devices comprising:
a receiver operative to receive said time synchronization messages from said entity;
a processor operative to implement a clock;
wherein said processor adjusts a rate of accumulation of time in said clock in response to the reception of said time synchronization messages; and
wherein said processor monitors at least one power parameter in said power system;
wherein said processor records a time of said clock when a fault occurs in said power system.

83. The system of claim 82 wherein said messages comprise communications packets.

84. The system of claim 83 wherein said entity comprises a master computer.

85. The system of claim 83 wherein said entity comprises a GPS receiver.

86. The system of claim 82 wherein said entity comprises at least one GPS satellite.

87. A method of maintaining time synchronization in a power monitoring device, the power monitoring device being coupled to a power system operating at a first frequency and comprising at least one processor operating at a second frequency, the method comprising:
receiving at least one time message from a time source;
accumulating counts in a free running counter in response to the second frequency;
advancing the internal time of the power monitoring device by a predetermined amount in response to said accumulation; and
adjusting said amount in response to indications from a time synchronization source;
wherein said time synchronization source comprises said time source; and
wherein said adjusting further comprises:
determining a difference between said time message and said internal time;
calculating a rate of change of said difference; and
adjusting said amount in response to said difference and said rate of change.

88. A method of maintaining synchronization between a clock in a power monitoring device and a clock in an entity, the power monitoring device being coupled to a power system, the method comprising:
monitoring at least one power parameter in the power system with the power monitoring device;
receiving an indication of time by the power monitoring device from said entity; wherein said receiving further comprises: receiving a message comprising a timestamp and an on time mark; and recording a first value of a free running counter upon reception of said on time mark;
adjusting the rate of accumulation of time in the clock in the power monitoring device to track the clock in the entity;
recording a second value of said free running counter at a later time;
calculating a first difference in time between said second value and said first value, said timestamp being adjusted for said first difference;
adjusting the rate of accumulation in accordance with a second difference in time between said timestamp and a time in the clock in the power monitoring device; and
wherein said adjusting is further in accordance with a rate of change of said second difference from one reception to a next reception.

89. The method of claim 88, wherein said indication comprises a communications packet.

90. The method of claim 89, wherein said communications packet is generated by a GPS receiver.

91. The method of claim 90, further comprising:
recording a time of occurrence of a fault in the power system using the clock.

92. The method of claim 89, further comprising:
recording a time of occurrence of a fault in the power system using the clock.

93. A system for maintaining time synchronization between a plurality devices comprising:

an entity, said entity comprising a master clock and said entity generating time synchronization messages;

a plurality of power monitoring devices coupled to a power system; said power monitoring devices comprising:

a receiver operative to receive said time synchronization messages from said entity;

a processor operative to implement a clock;

wherein said processor adjusts a rate of accumulation of time in said clock in response to the reception of said time synchronization messages; and wherein said processor monitors at least one power parameter in said power system;

wherein said processor is further operative to implement a free running counter; said processor being operative to record the value of said free running counter when said messages are received and when said processor adjusts the rate of accumulation of time; and wherein said processor adjusts said time synchronization message for the difference between said two free running counter values before said processor adjusts the rate of accumulation of time;

wherein said processor adjusts the rate of accumulation of time in said power monitoring device in accordance with a difference in time between said clock and said time synchronization message and further wherein said processor adjusts the rate of accumulation of time in accordance with a rate of change of the difference in time.

* * * * *

UNITED STATES PATENT AND TRADEMARK OFFICE
CERTIFICATE OF CORRECTION

PATENT NO. : 6,611,922 B2
DATED : August 26, 2004
INVENTOR(S) : H. Kurtulus Ozcetin et al.

It is certified that error appears in the above-identified patent and that said Letters Patent is hereby corrected as shown below:

Title page,
Item [56], References Cited, OTHER PUBLICATIONS, "QUAD4®" reference, delete "On-LIne" and substitute -- On-Line -- in its place.
"EnergyAxis™" reference, delete "On-SIte" and substitute -- On-Site -- in its place.
"8500 ION®" reference, delete "MEter," and substitute -- Meter, -- in its place.
"American National Standard for Electric Meters" reference, delete "COde" and substitute -- Code -- in its place.
"American National Standard for Electronic TIme" reference, delete "TIme" and substitute -- Time -- in its place.

Column 20,
Line 14, after "the rate" delete "off" and substitute -- of -- in its place.
Line 58, immediately after "the clock" delete ":" (colon) and substitute -- ; -- (semicolon) in its place.

Signed and Sealed this

Sixth Day of July, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,611,922 B2
DATED : August 26, 2003
INVENTOR(S) : H. Kurtulus Ozcetin et al.

It is certified that error appears in the above-identified patent and that said Letters Patent is hereby corrected as shown below:

Title page,
Item [56], References Cited, OTHER PUBLICATIONS, "QUAD4®" reference, delete "On-LIne" and substitute -- On-Line -- in its place.
"EnergyAxis™" reference, delete "On-SIte" and substitute -- On-Site -- in its place.
"8500 ION®" reference, delete "MEter," and substitute -- Meter, -- in its place.
"American National Standard for Electric Meters" reference, delete "COde" and substitute -- Code -- in its place.
"American National Standard for Electronic TIme" reference, delete "TIme" and substitute -- Time -- in its place.

Column 20,
Line 14, after "the rate" delete "off" and substitute -- of -- in its place.
Line 58, immediately after "the clock" delete ":" (colon) and substitute -- ; -- (semicolon) in its place.

This certificate supersedes Certificate of Correction issued July 6, 2004.

Signed and Sealed this

Twenty-eighth Day of September, 2004

JON W. DUDAS
*Director of the United States Patent and Trademark Office*